(12) United States Patent
Wang et al.

(10) Patent No.: US 6,463,844 B1
(45) Date of Patent: Oct. 15, 2002

(54) BAKING PAN

(75) Inventors: Kenny Wang, Benicia, CA (US); Chao-Hsiang Tong, Benicia, CA (US)

(73) Assignee: Testrite Baparoma International, LLC, Benicia, CA (US)

(*) Notice: Subject to any disclaimer, the term of this patent is extended or adjusted under 35 U.S.C. 154(b) by 0 days.

(21) Appl. No.: 09/632,902

(22) Filed: Aug. 4, 2000

(51) Int. Cl.⁷ .................................................. A47J 27/04
(52) U.S. Cl. ............................ 99/426; 99/413; 99/400
(58) Field of Search .................... 99/339, 340, 426, 99/410, 413, 400, 446, 450; 126/369; 220/972, 573.1, 573.4

(56) References Cited

U.S. PATENT DOCUMENTS

| | | | |
|---|---|---|---|
| 2,932,293 A | 4/1960 | Rassieur | 126/369 |
| 3,046,971 A | 7/1962 | Hogshire | 126/369 |
| 3,212,426 A | 10/1965 | Lewus | |
| 3,548,736 A | 12/1970 | Wahl | 99/450 |
| 3,612,036 A | 10/1971 | Kaufman | |
| 3,735,749 A | 5/1973 | Binks et al. | 126/20 |
| 3,794,016 A | 2/1974 | Binks et al. | 126/369 |
| 3,889,582 A | 6/1975 | Binks et al. | 99/450 |
| 3,946,893 A | 3/1976 | Bowersmith | 220/573.4 |
| 3,972,318 A | 8/1976 | Lenoir | 126/348 |
| 4,058,635 A | 11/1977 | Durth | 426/509 |
| 4,092,909 A | 6/1978 | Phillips | 99/444 |
| 4,167,233 A | 9/1979 | Hare | 220/669 |
| 4,262,026 A | 4/1981 | Korkmaz | 426/243 |
| 4,509,412 A | 4/1985 | Whittenburg et al. | 99/331 |
| 4,590,078 A | 5/1986 | Umina | 426/113 |
| 4,617,908 A | 10/1986 | Miller et al. | 126/369 |
| 4,640,186 A * | 2/1987 | Hackelsberger | 99/495 |
| 4,644,858 A | 2/1987 | Liotto et al. | 99/449 |
| 4,676,151 A | 6/1987 | Gorsuch et al. | 99/450 |
| 4,701,340 A | 10/1987 | Bratton et al. | 426/511 |
| 4,861,601 A | 8/1989 | Seneau | 426/19 |
| 4,906,485 A | 3/1990 | Kirchhoff | 426/506 |
| 4,941,401 A * | 7/1990 | Sarnoff et al. | 99/413 X |
| 4,978,542 A | 12/1990 | Buckley | 426/243 |

(List continued on next page.)

FOREIGN PATENT DOCUMENTS

| | | |
|---|---|---|
| DE | 3701 366 A1 | 7/1988 |
| EP | 0 824 863 A2 | 2/1998 |
| HU | 188 020 | 12/1987 |
| WO | WO 93/07755 | 4/1993 |

OTHER PUBLICATIONS

Gisslen, Wayne. *Professional Baking*. 2nd Edition. John Wiley & Sons Inc., New York, pp. 35–37 & 100.

*Primary Examiner*—Reginald L. Alexander
(74) *Attorney, Agent, or Firm*—R. Neil Sudol; William Sapone; Henry Coleman

(57) ABSTRACT

A baking pan includes a lower pan part having a respective periphery and at least one raised area spaced from that periphery. The pan further includes an upper pan part having a respective periphery, the upper pan being removably connected to the lower pan part about the periphery of the upper pan part. This pan is utilizable in a cooking method including a dough proofing stage and a baking process. The baking process in turn incorporates a first cycle of baking and steaming and a second cycle of baking only. The baking pan has a water-receiving internal chamber and a proofing and cooking chamber communicating with the internal chamber via one or more perforations in an upper surface of the baking pan. The proofing and cooking chamber is formed by a cover or lid placed over the upper surface of the baking pan.

33 Claims, 23 Drawing Sheets

U.S. PATENT DOCUMENTS

| | | | |
|---|---|---|---|
| 5,012,947 A | 5/1991 | Roland | 220/573.1 |
| 5,075,121 A | 12/1991 | Desage et al. | 426/233 |
| 5,189,945 A | 3/1993 | Hennick | 99/339 |
| 5,199,347 A | 4/1993 | Chen | 99/418 |
| 5,211,105 A | 5/1993 | Liu | 99/446 |
| 5,367,951 A | 11/1994 | Purvis | 99/450 |
| 5,503,063 A | 4/1996 | Sebald | 99/447 |
| 5,680,956 A | 10/1997 | Woodward et al. | 220/607 |
| 5,776,532 A | 7/1998 | Wang | 426/511 |
| 5,782,165 A | 7/1998 | Glenboski et al. | 99/340 |
| 5,800,853 A | 9/1998 | Wang | 426/511 |
| 5,955,130 A | 9/1999 | Gagliardi et al. | 426/241 |
| 5,988,045 A | 11/1999 | Housley | 99/339 |
| 5,993,878 A | 11/1999 | Tippmann | 426/510 |

\* cited by examiner

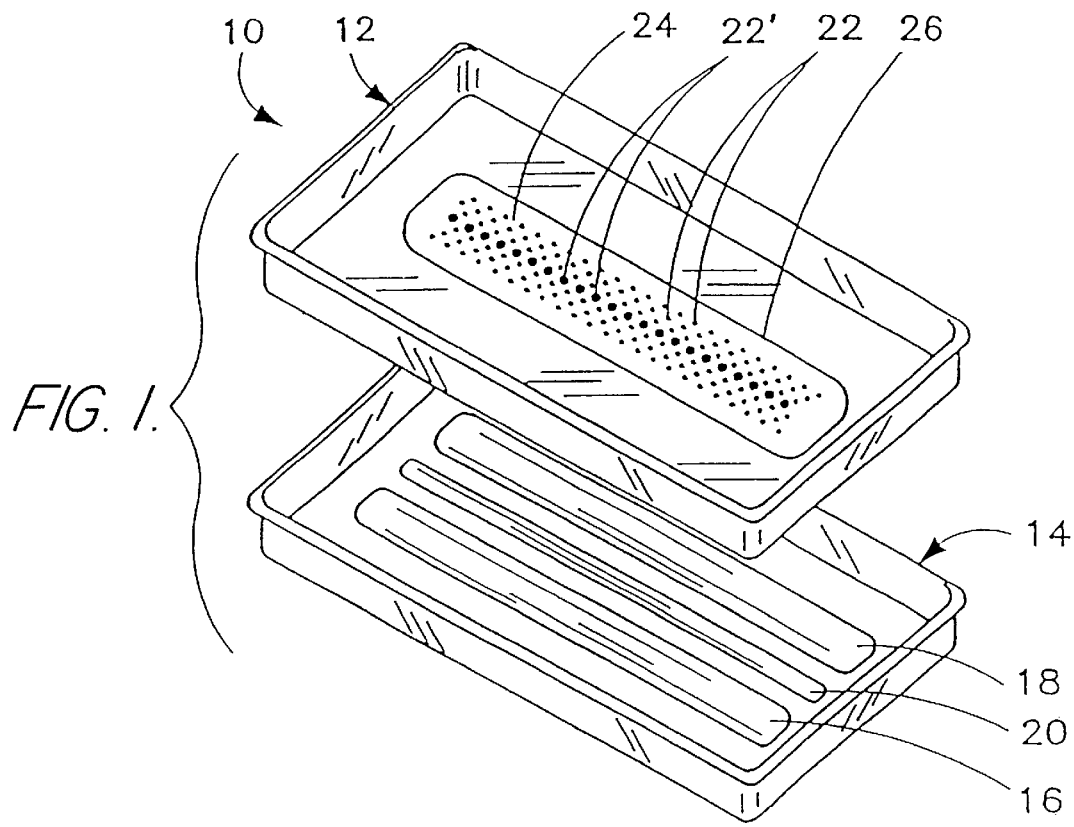
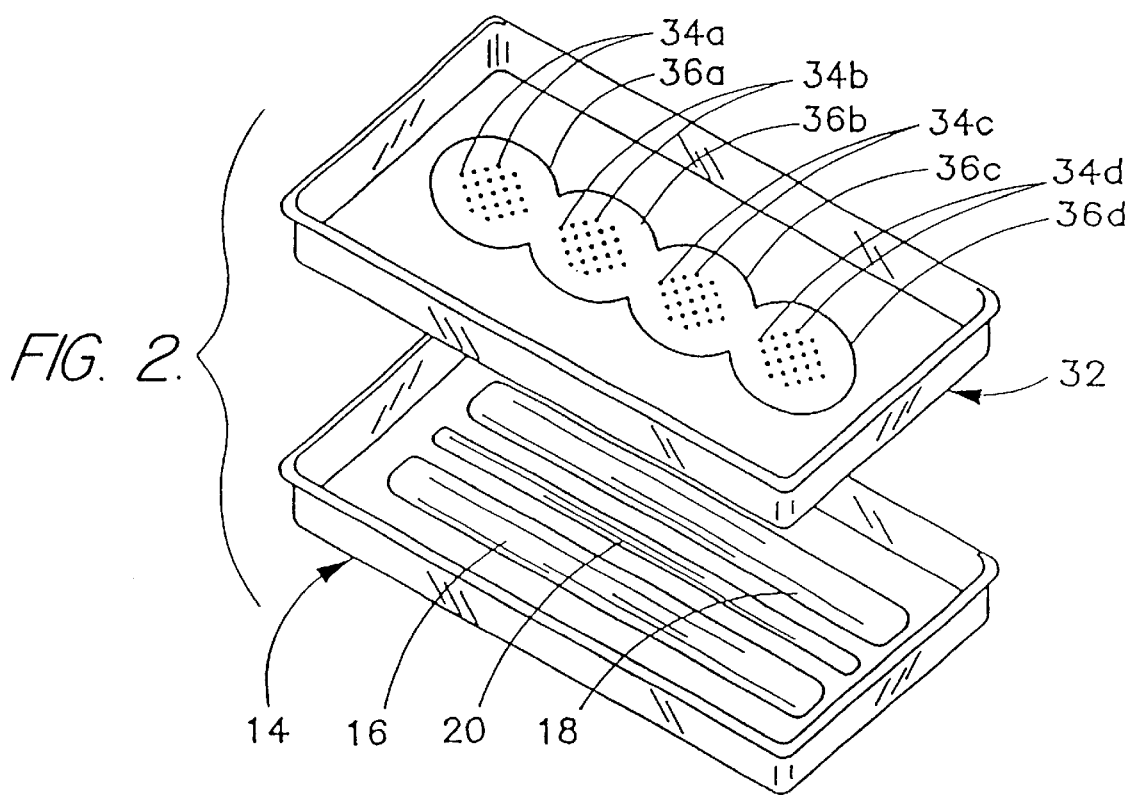

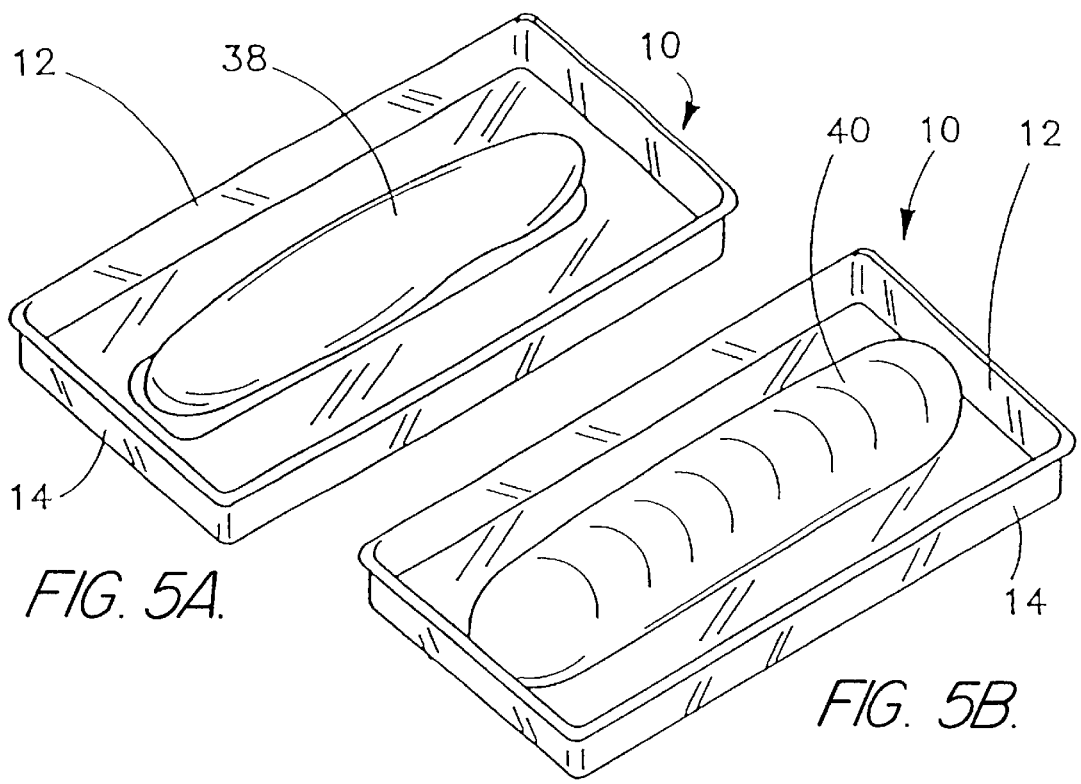
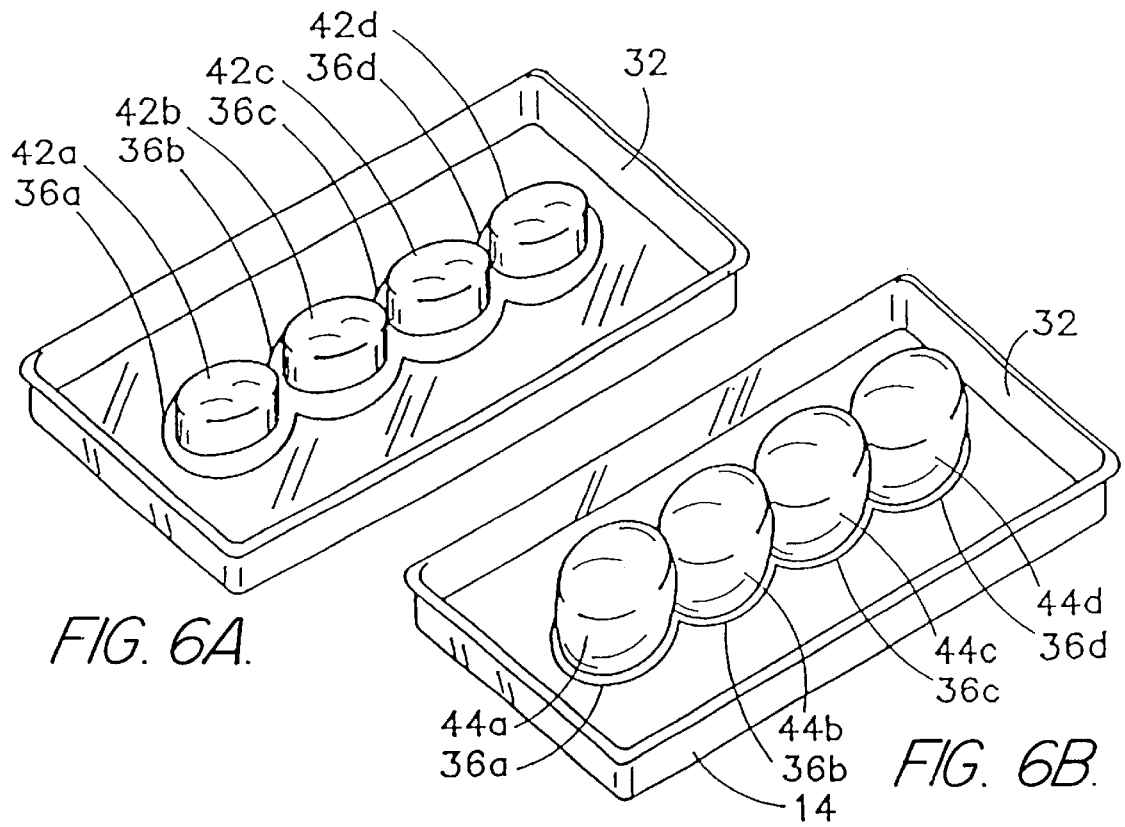

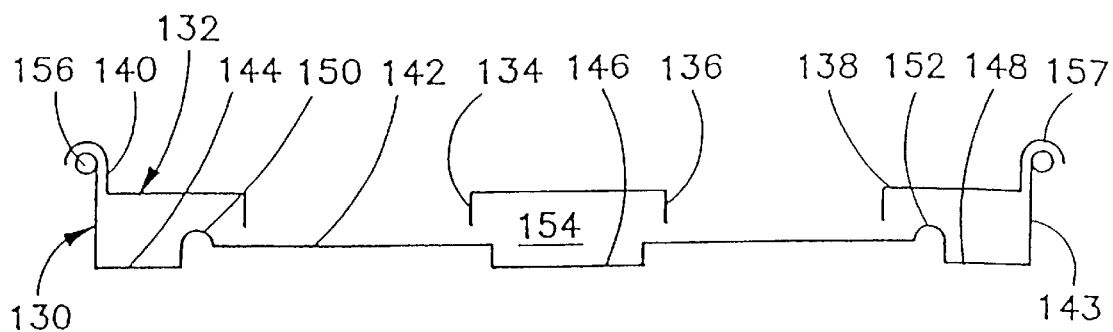
FIG. 14.
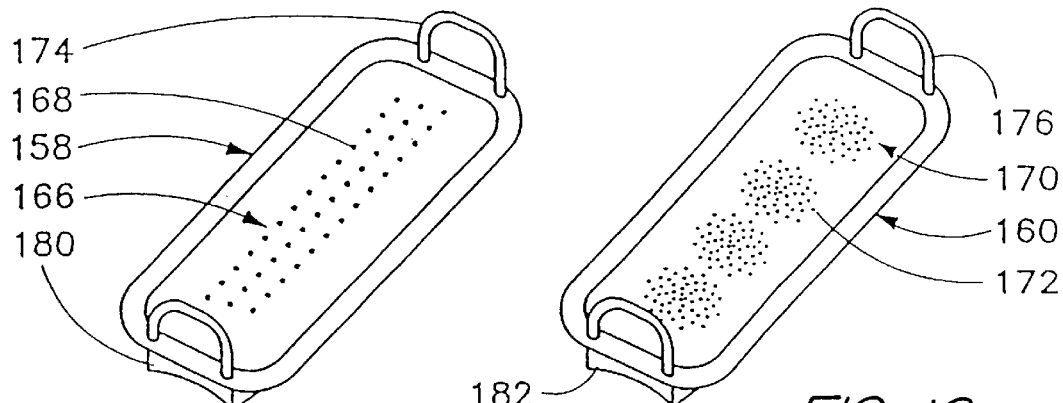
FIG. 15.          FIG. 16.
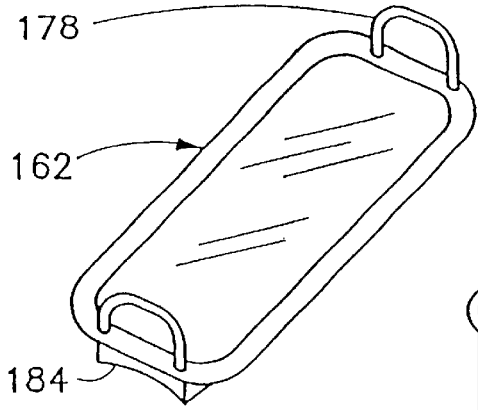          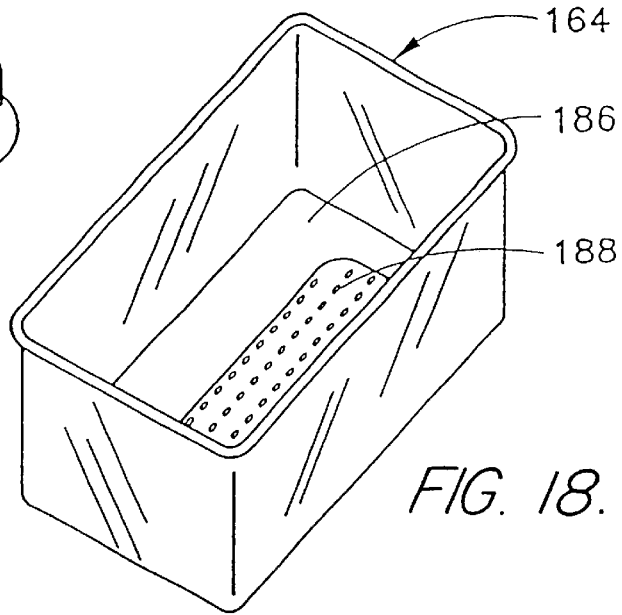
FIG. 17.          FIG. 18.

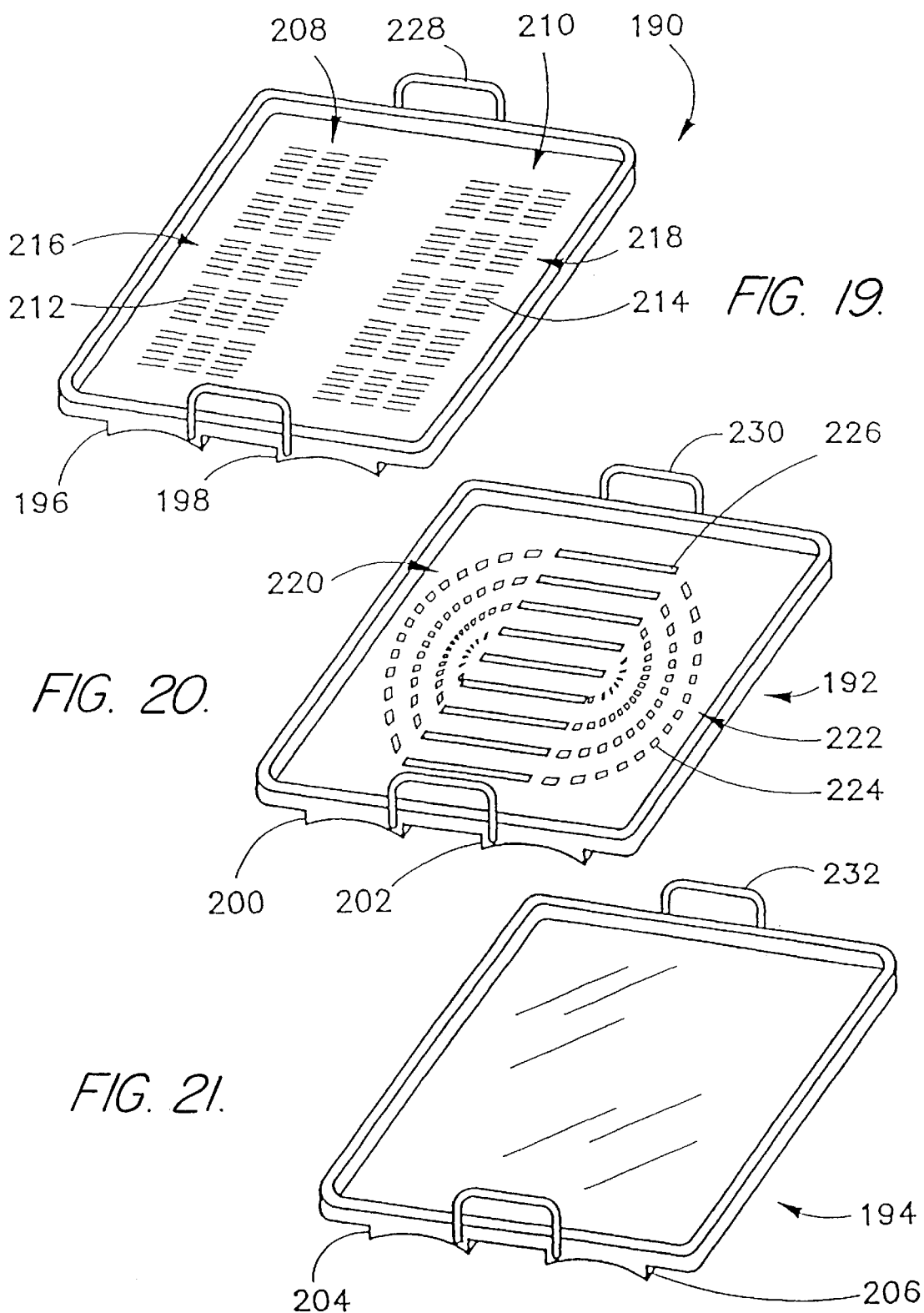

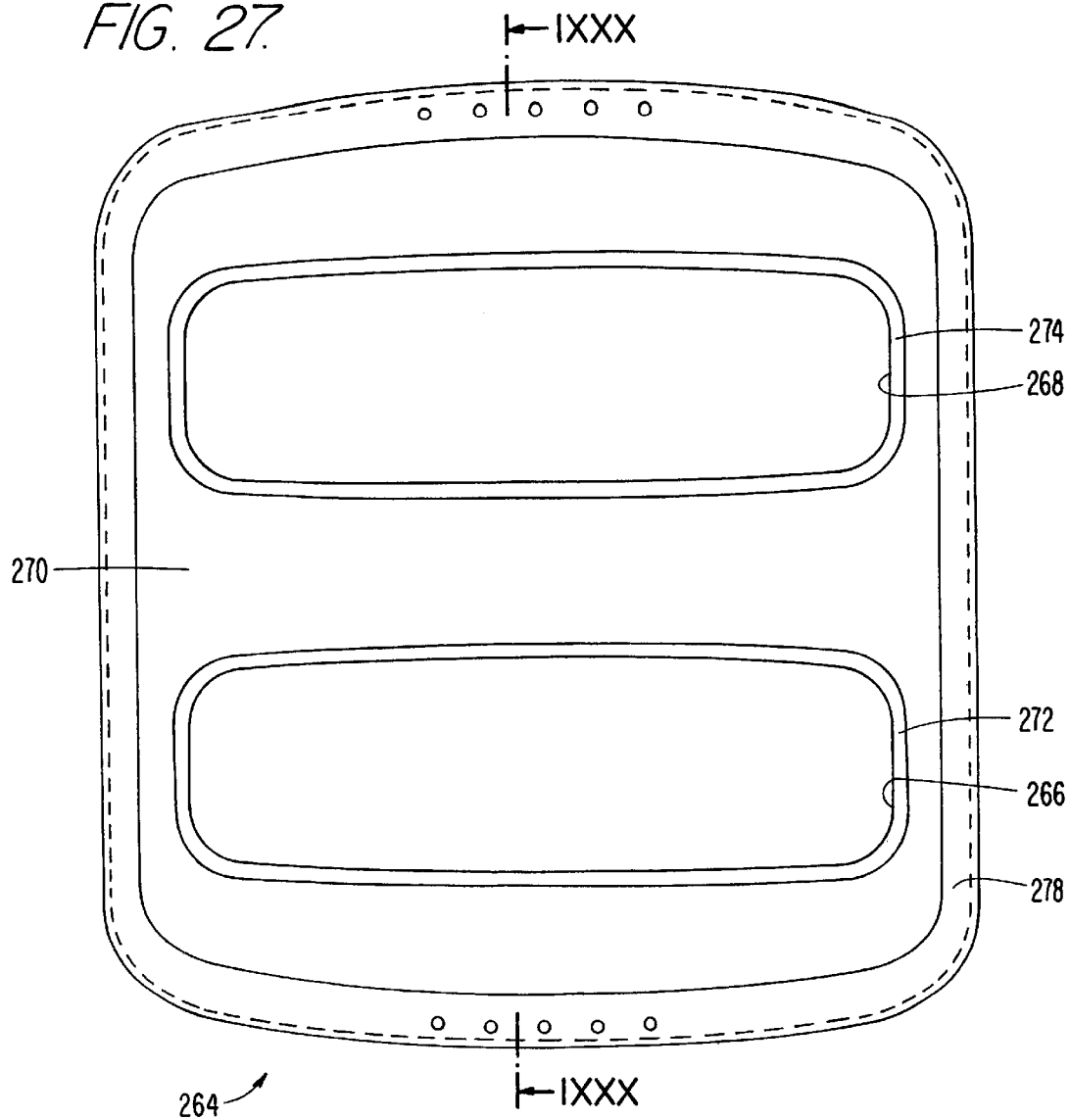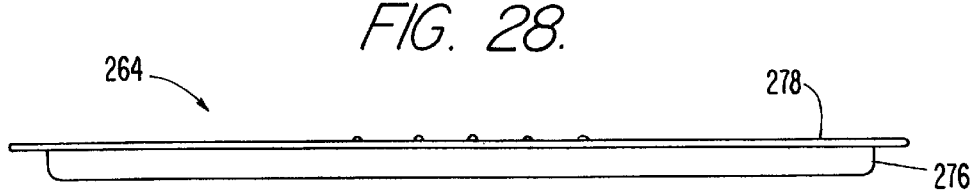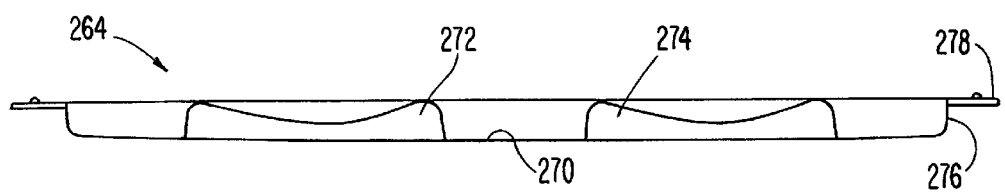

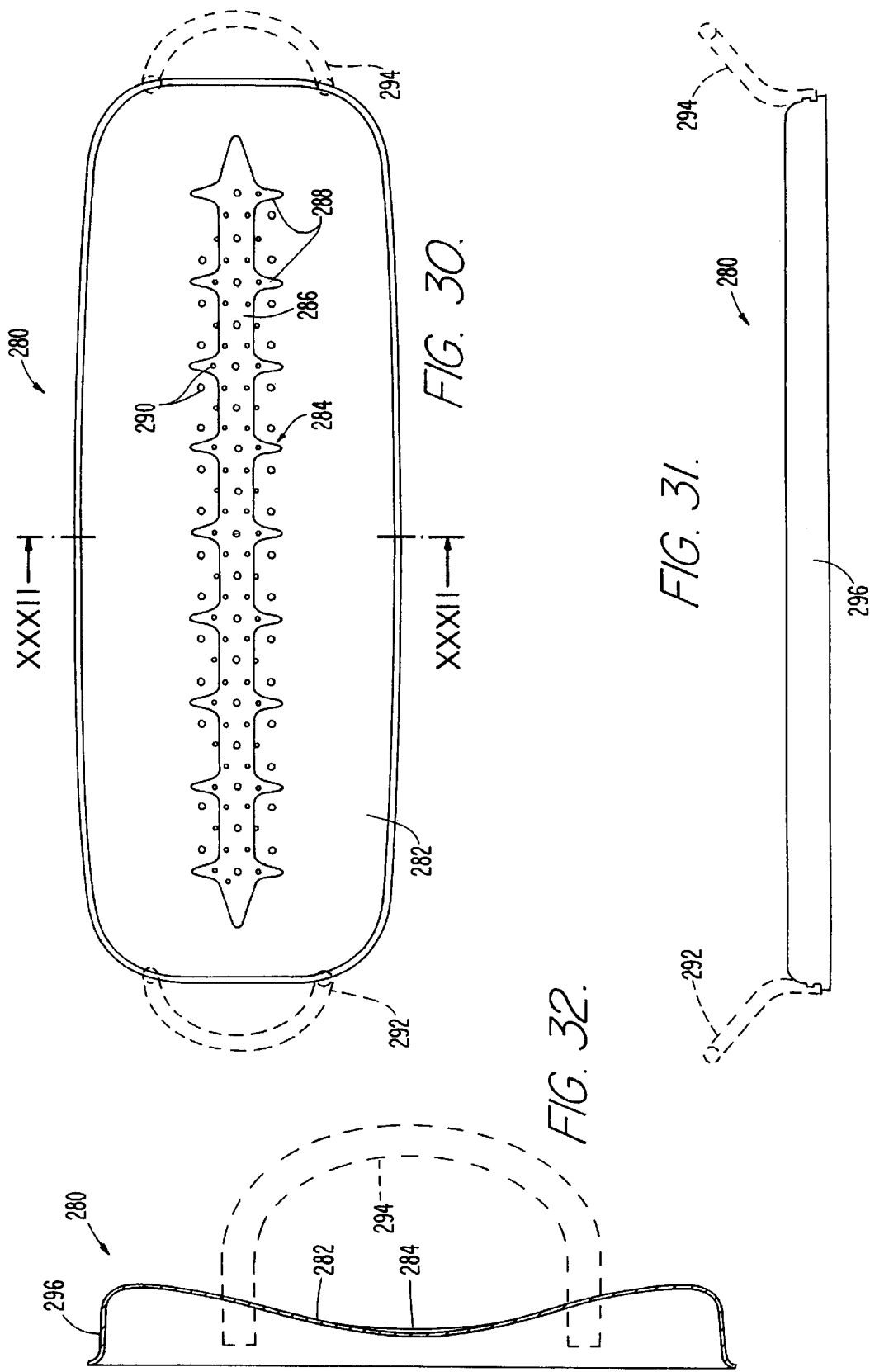

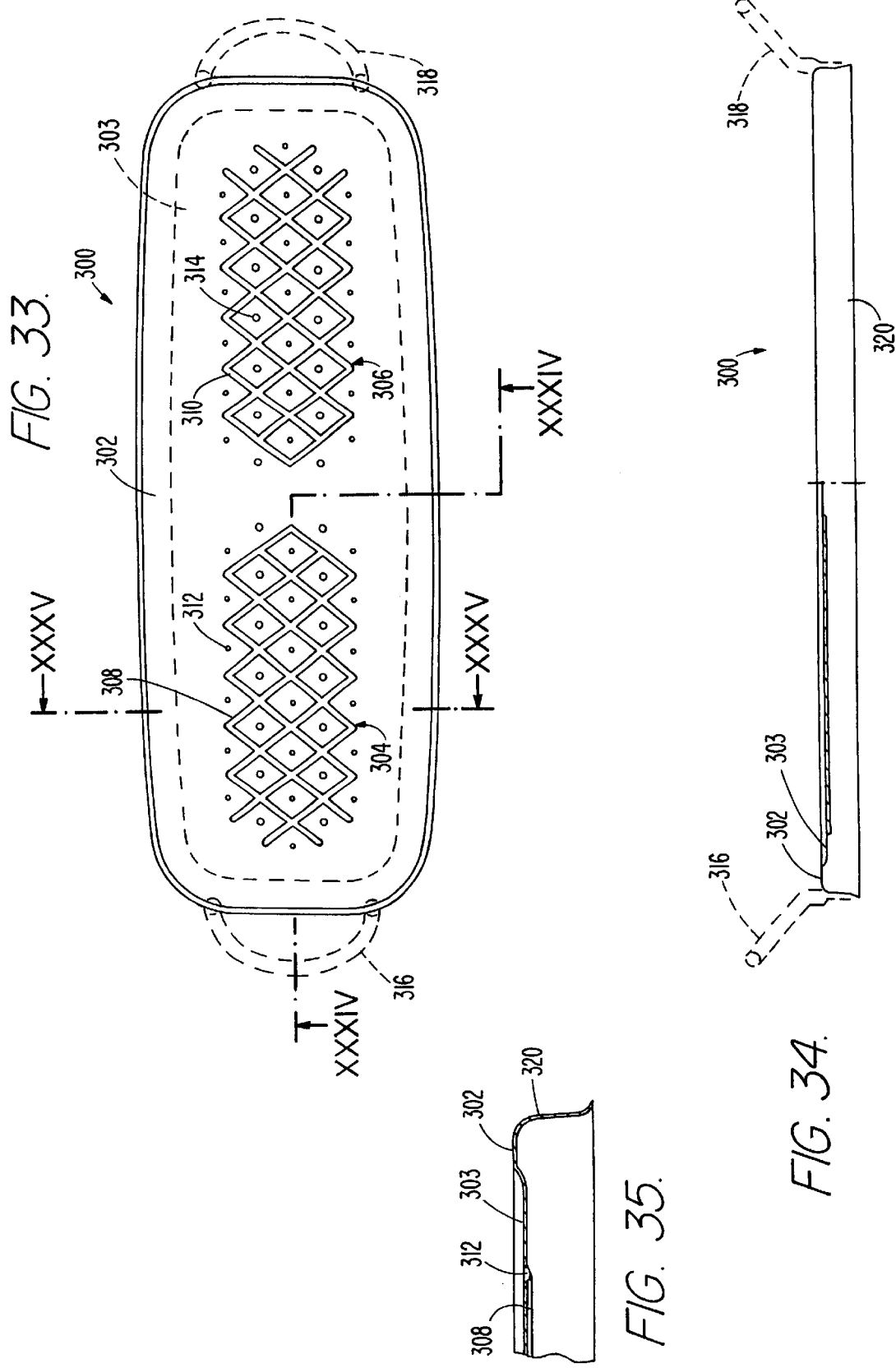

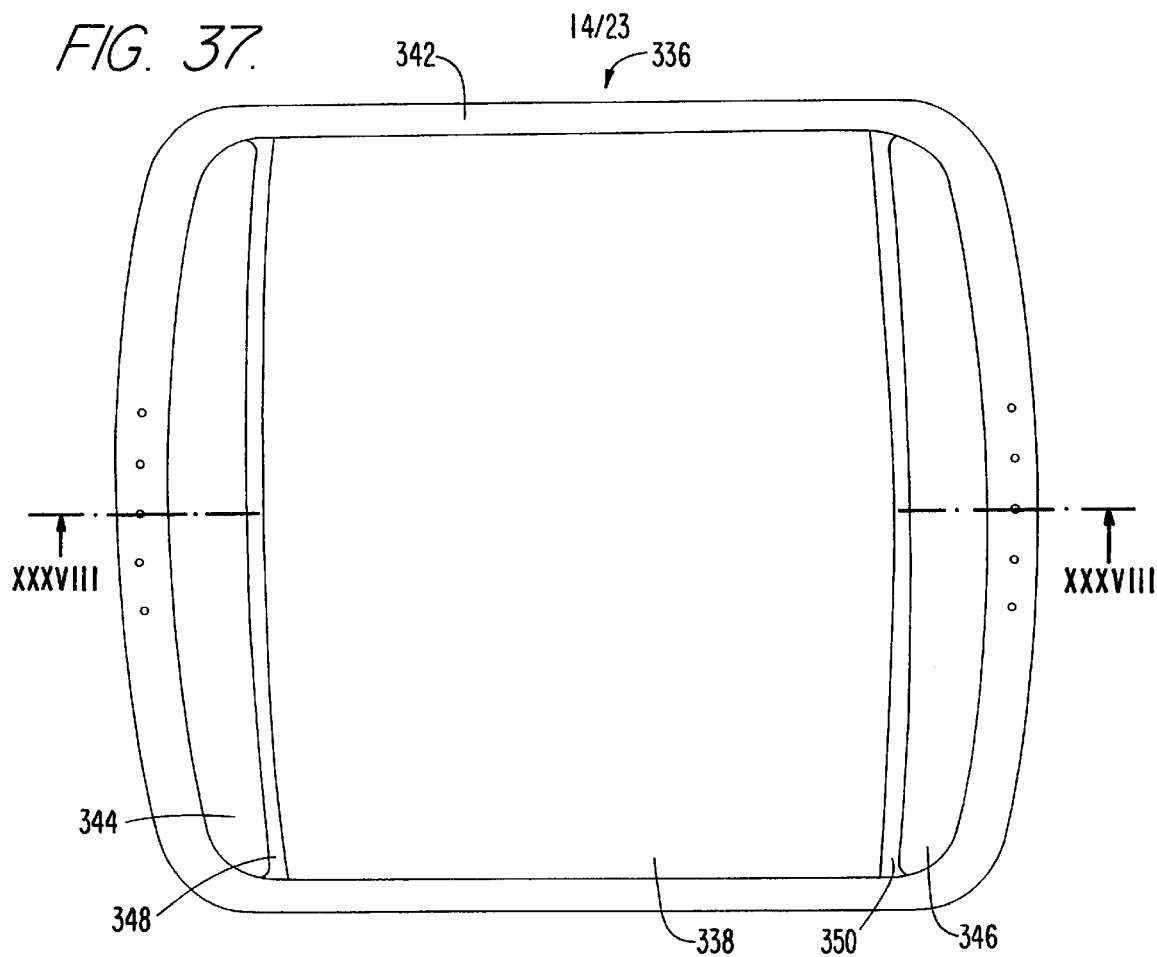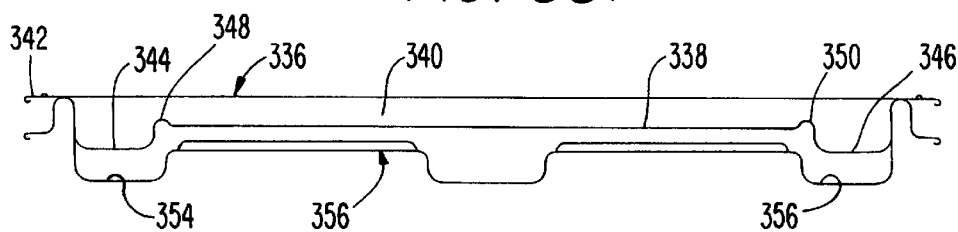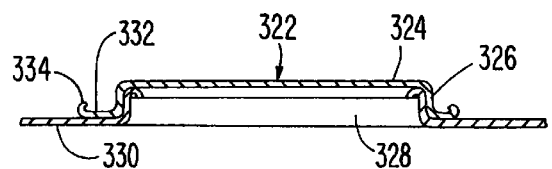

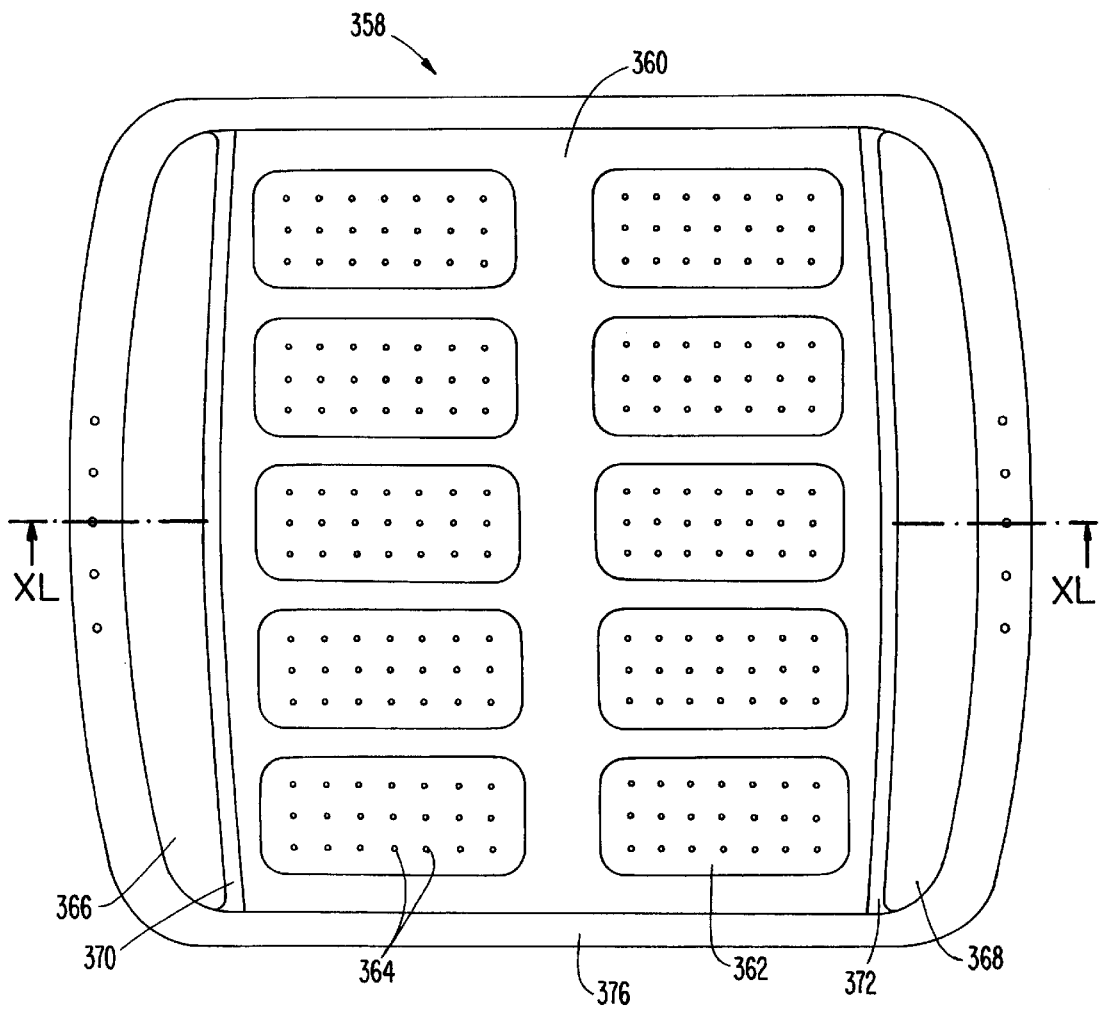
FIG. 39.
FIG. 40.
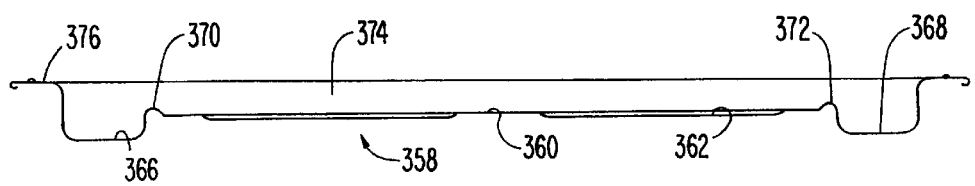

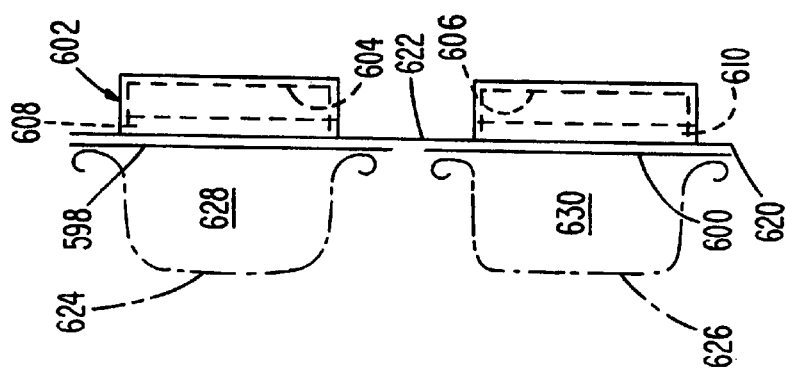
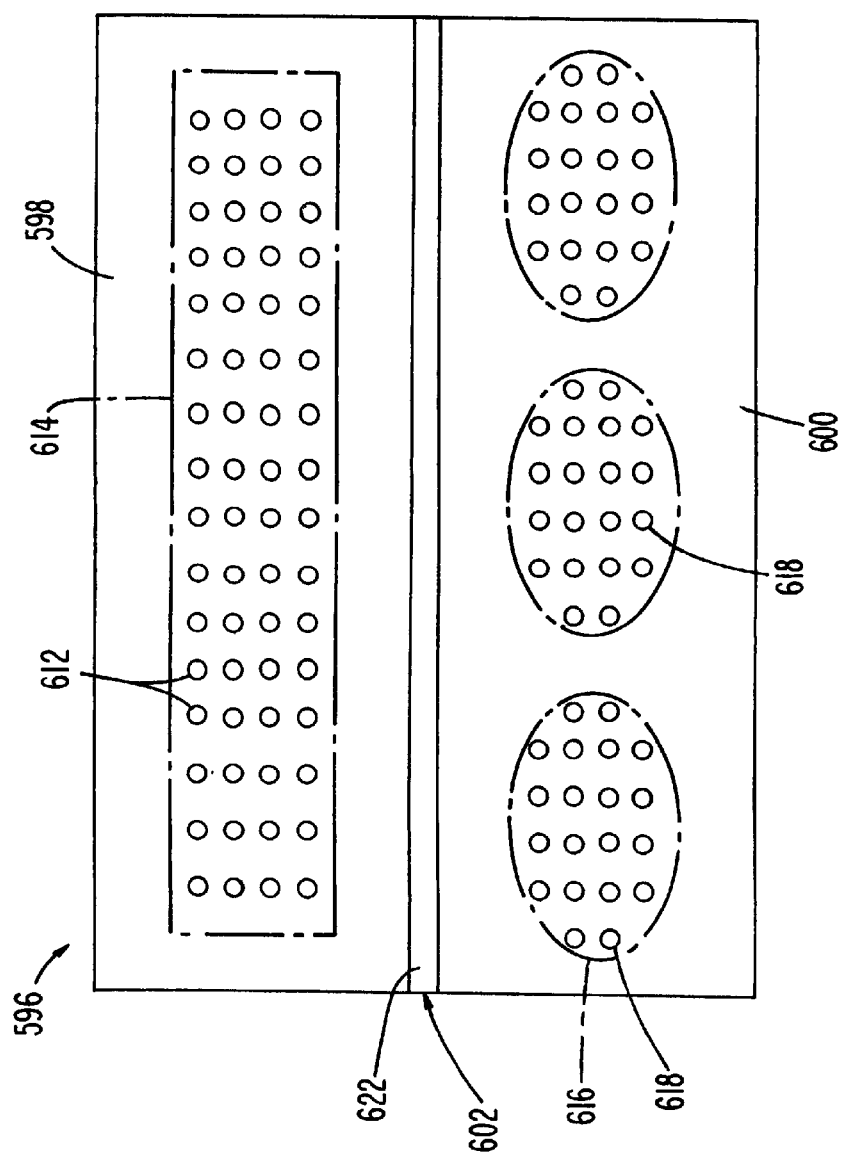

BAKING PAN

BACKGROUND OF THE INVENTION

This invention relates to a baking pan. This invention more particularly relates to a baking pan utilizable in a steaming and baking process in a heated enclosure.

Several steps are involved in making a good loaf of bread. The first step comprises the proper development of dough by kneading of a mixture of flour, water, salt, yeast (chemical leavening agents), and/or other ingredients. The dough is stored at a constant temperature and humidity for a period of time, known as proofing, so that the dough expands due to the generation of carbon dioxide through the reactions of yeast or the chemical leavening agents. The proofed dough is then baked in an oven to develop the necessary texture, crust, color, and flavor.

For mass production, proofing is conducted in a proof chamber or box at a temperature between 90 and 100° F. to accelerate the growth of yeast or the chemical reactions that lead to the production of carbon dioxide. To avoid drying of the outer surface of the dough the relative humidity of the proof chamber or box is generally maintained between 80 and 90%. To proof on a small scale, one or two loaves, of dough of consistent quality for home baking may not be an easy task. Home baking is quite often practiced in winter months when the ambient temperature and relative humidity are lower than the optima for proofing. Covering the dough with a wet cloth or towel or a plastic film is recommended to prevent the surface from becoming dried out. However, the cloth or film may stick to the dough surface so that its removal is very difficult. The proofing time can be quite long when the ambient temperature is low.

As is well known, injecting steam at the beginning of a baking process helps make a better loaf of bread and is the basis for various types of professional and industrial ovens. The steam keeps the surface of the dough moist and extensible to result in a loaf of greater volume without ragged breaks and good interior crumb texture. The steam also leads to a crisper and glossier crust because of the greater swelling of surface starch granules. Through the modifications of the Maillard pathways, the surface color is also affected by the presence of steam.

U.S. Pat. Nos. 5,776,532 and 5,800,853 disclose a baking method and associated baking pan paraphernalia that make steam available in household ovens for baking a variety of baked goods. This disclosure is directed to improvements in the baking method and related baking apparatus disclosed in those prior patents.

OBJECTS OF THE INVENTION

An object of the present invention is to provide a baking pan apparatus utilizable in a baking and steaming process.

Another object of the present invention is to provide a baking pan utilizable in a food preparation process including an initial proofing portion and a subsequent cooking portion. More specifically, an object of the present invention is to provide at least one baking pan in accordance with the present invention is utilizable in such a food preparation process wherein the cooking portion includes an initial steaming/baking cycle and a subsequent baking only cycle.

These and other objects of the present invention, each attainable by one or more embodiments of the invention, will be apparent from the drawings and descriptions herein.

SUMMARY OF THE INVENTION

A baking pan according to the present invention is utilizable in a cooking process involving a first steaming/baking cycle and a subsequent baking only cycle, as described in U.S. Pat. Nos. 5,776,532 and 5,800,853. The pan is also utilizable in a related or extended cooking method for a baked food product wherein the cooking process includes a dough proofing stage and a baking process. This baking process preferably includes a first cycle of baking and steaming and a second cycle of baking only. Pursuant to the present invention, this cooking method may be carried out with the aid of a cooking apparatus or assembly including a baking pan with a water-receiving internal chamber and a proofing and cooking chamber communicating with the internal chamber via one or more perforations in an upper surface of the baking pan. The proofing and cooking chamber is formed by a cover or lid placed over the upper surface of the baking pan.

A method for producing a cooking dough product utilizes, in accordance with the present invention, a baking-type pan having at least one recess or reservoir, at least one upper surface, and at least one perforation. The proofing method comprises (I) depositing an amount of water in the recess or reservoir, (II) placing, on the upper surface of the pan, at least one piece of a dough containing a leavening agent, and (III) providing a chamber about at least a portion of the dough (preferably all of the dough), the chamber being defined in part by a portion of the upper pan surface including the perforation, and (IV) maintaining the portion of dough in the chamber for a predetermined proofing interval, to allow water vapor to pass from the recess or reservoir via the perforation to increase the humidity in the chamber and to facilitate a rising of the dough.

The method preferably utilizing a baking pan according to the present invention additionally comprises disposing the pan, the dough, and the water in an oven, and turning on the oven for a limited period to heat the oven to a proofing temperature. In this case, an optimal proofing temperature is generated by oven heat. In another approach, the proofing temperature is attained by depositing hot water in the recess or reservoir of the baking pan. A cover or lid is placed on the baking pan so as to define the chamber. This assembly may be placed virtually anywhere, for example, in the oven, on a kitchen counter or on a table top, during the proofing process.

The cooking method preferably further comprises turning on the oven to heat the oven to at least one baking temperature after termination of the predetermined proofing interval and the rising of the dough. The baking pan and the dough may be already in place in the oven during the proofing process or, alternatively, may be placed in the oven only for a baking process. During a first portion of the baking process commencing upon heating of the oven to the baking temperature, the water in the recess or reservoir is converted to steam at least a part of which is fed to a lower surface of the risen dough. After all of the water is converted to steam, the risen dough is baked during a second portion of the baking process.

The cooking method may further comprise, prior to a commencement of the predetermined proofing interval, positioning, on the pan, at least one lid or cover to define the proofing chamber containing at least a portion of the dough. The lid is disposed in the oven together with the pan, the dough, and the water. The water vapor is directed through the perforation to the chamber to increase a level of humidity in the chamber during the proofing interval. This lid or cover may be a preformed rigid element or, alternatively, an extemporaneously formed temporary structure made, for instance, of aluminum foil.

Where the proofing of the dough is followed directly by a combined steaming and baking process, the lid or cover may be retained in position on the pan during the steaming to facilitate a moistening or wetting of upper surfaces of the dough by steam escaping into the proofing chamber, now functioning as a cooking chamber. Thus, at least part of the steam is directed to the chamber to moisten an upper surface of the dough.

The lid may remain in place on the baking pan during the entire proofing, steaming and baking process. Alternatively, the lid may be removed from the pan prior to termination of the second (baking only) portion of the baking process. The baking pan may be removed even prior to the commencement of the second (baking only) portion of the baking process, i.e., during the steaming and baking cycle of the entire process.

A lid or cover utilizable in a proofing and/or baking method pursuant to the present invention may be perforated or non-perforated. When used in a baking process, the lid or cover serves not only to retain escaped steam but also to lower the temperature in a neighborhood about a dough based food item disposed in the cooking chamber defined by the lid or cover and the baking pan. The increased moisture and lowered temperature inside the cooking chamber delay the crust development of upper surfaces of the food item.

A baking pan kit including a lid or cover in accordance with the present invention is useful not only in a baking process per se but also facilitates proofing of the dough prior to baking. Thus, an effective proofing device is provided by the present invention when the pan, water and cover are placed in an oven, and then briefly heated. The baking pan, water and cover absorb heat from the oven during the brief heating of the oven and subsequently release heat to the oven when the oven cools down, making the oven temperature substantially uniform over a period extended to effectively implement proofing. The relatively high moisture level produced in a proofing chamber defined by the baking pan and the lid or cover reduces surface drying of the dough. Furthermore, the dough and the baking pan can be brought directly to the baking temperature after proofing.

The perforation in the baking pan may one of at least two perforations in the upper surface of the baking pan. In that case, at least some of the perforations are open or uncovered at an onset of the first portion of the baking process. The method then further comprises expanding the dough during the first portion of the baking process so that the dough covers at least some of the open perforations by an end of the first portion of the baking process. This feature of the method is described in greater detail hereinafter.

The baking pan may include an upper pan part and a lower pan part, the upper surface (receiving the dough) being on the upper pan part, the water-receiving recess being located in the lower pan part. The method then further comprises assembling the upper pan part to the lower pan part prior to the disposing of the pan in the oven.

Where the recess or reservoir is one of a plurality of recesses or reservoirs each provided with a respective amount of water, the method further comprises (A) after termination of the proofing interval and the rising of the dough, turning on the oven to heat the oven to at least one baking temperature to commence a baking process having at least a first phase, a second phase and a third phase, (B) converting the water in both of the recesses or reservoirs to steam during the first phase of the baking process, (C) feeding a part of the steam to a lower surface of the dough and another part of the steam to an upper surface of the dough also during the first phase, (D) converting water in only one of the recesses or reservoirs to steam during the second phase of the baking process, the water in the other of the recesses or reservoirs being depleted by an end of the first phase, (E) feeding steam from the one of the recesses or reservoirs to only one of the lower surface and the upper surface of the dough during the second phase, and (F) subjecting the dough to only conventional baking during the third phase of the baking process, the water in the one recess or reservoir being depleted by an end of the second phase.

Preferably, the proofing temperature is between approximately 80° F. and approximately 110° F. More preferably, the proofing temperature is between approximately 90° F. and approximately 100° F. Concomitantly, the proofing interval is preferably between thirty minutes and an hour.

A baking pan in accordance with the present invention may additionally or alternatively be utilized in a cooking method comprising placing a food article in a heated enclosure, thereafter delivering an amount of steam to a lower surface of the food article during a first time interval and also delivering a quantity of moisture to an upper surface of the food article during a second time interval, and, upon completion of the delivery of steam to the lower surface of the food article and moisture to the upper surface of the food article, subjecting the food article to only conventional baking in the heated enclosure during a third time interval beginning after termination of the first time interval and the second time interval.

Where the placing of the food article in the heated enclosure includes positioning the food article on an upper panel of a baking pan also having a lower panel, the placing of the food article in the heated enclosure further includes disposing the pan in the heated enclosure, while the delivering of steam to the lower surface of the food article includes feeding the steam through first perforations in the upper panel of the baking pan to the lower surface of the food article. In addition, delivering moisture to the upper surface of the food article includes feeding the moisture through second perforations in the upper panel of the baking pan to the upper surface of the food article.

Where the lower panel of the baking pan has a first recess communicating with the first perforations and a second recess communicating with the second perforations, the cooking method further comprises depositing a first amount of water in the first recess and a second amount of water in the second recess. Then, the delivering of steam to the lower surface of the food article includes converting water in the first recess to steam for delivery through the first perforations, while delivering moisture to the upper surface of the food article includes converting water in the second recess to steam for delivery through the second perforations.

The placing of the food article in the heated enclosure may also include placing a lid on the baking pan and over at least a portion of the food article to thereby define a chamber containing the food article. In that case, the moisture is delivered to the chamber and thereby to the upper surface of the food article.

A two-piece baking pan in accordance with the present invention can alternatively be used for grilling. In that case, the lower pan functions to catch and hold drips. In any event, the air space or spaces between the lower pan and the upper pan can additionally function as an insulating layer, whether or not the lower pan holds water or grease drippings.

A cooking method comprises, pursuant to a further embodiment of the present invention, (I) placing dough on a pan having at least one perforation in an upper surface and an internal chamber communicating with the perforation, the perforation being open or uncovered by the dough at an onset of a first phase of a baking process, (II) depositing water in the internal chamber, (III) placing the dough, the pan, and the water in a heated enclosure, (IV) thereafter expanding the dough so that the dough covers the initially open or uncovered perforation by an end of the first phase of the baking process, (V) converting the water to steam in the internal chamber during the first phase of the baking process, (VI) applying steam from the internal chamber to a lower surface of the dough via the perforation after expanding of the dough to cover the perforation, and (VII) subjecting the dough to only baking during a second phase of the baking process, all of the water having been converted to steam by the end of the first phase of the baking process.

Preferably, the water is deposited in the internal chamber of the pan prior to placement of the pan in the heated enclosure or oven. However, it is also possible, depending on the pan design, to deposit the water in the internal chamber of the pan after placing the pan in the heated enclosure. In another alternative procedure, water is placed in an oven with at least part of the baking pan and, after the water and the pan part have been preheated, the dough with or without another pan part is placed in the oven on the baking pan.

In this further embodiment of the invention, where the perforation is one of a plurality of perforations in the upper surface of the pan, the dough may cover at least one of the perforations at the onset of the first phase of the baking process. This method step enables an application of steam to the lower surface of the dough substantially throughout the first phase of the baking process.

The dough preferably covers at least 60% of the perforations by the end of the first phase of the baking process. More preferably, the dough covers at least 80% of the perforations by the end of the first phase of the baking process. Most preferably, the dough covers 100% of the perforations by the end of the first phase of the baking process.

In an optional step of this further embodiment of the invention, a cover is disposed on the upper surface of the pan and over the dough and the perforation, thereby forming a cooking chamber communicating with the internal chamber via the perforation. A concomitantly performed step is increasing a moisture level in the cooking chamber by water vapor escaping from the internal chamber via the perforation prior to covering of the perforation by the expanding of the dough.

The lid may be removed from the oven together with the pan and the baked dough product thereon. Alternatively, the lid may be removed from the pan prior to a removing of the pan and the dough from the heated enclosure. The lid may be removed even before the end of the first phase of the baking process, that is, before the termination of steam production. The steam increases a moisture level in the heated enclosure by escaping from the internal chamber of the pan via the perforation prior to covering of the perforation by the expanding of the dough.

Lower lateral surfaces of the dough may be wetted by steam escaping from the internal chamber via the perforation.

A baking pan comprises, in accordance with the present invention, a lower pan part having a respective periphery and at least one raised area spaced from that periphery. The pan further comprises an upper pan part having a respective periphery, the upper pan being removably connected to the lower pan part about the periphery of the upper pan part. The raised area of the lower pan part is in effective heat-transmitting contact with the upper pan part. Effective heat contact means that there is an operative heat transfer from the lower pan part to the upper pan part by convection and/or conduction. Preferably, the raised area of the lower pan part is spaced from the upper pan part by a distance of less than approximately 5 mm. More preferably, the raised area of the lower pan part is spaced from the upper pan part by a distance of less than approximately 2.5 mm. Most preferably, the raised area of the lower pan part is spaced from the upper pan part by a distance of less than approximately 1 mm.

Pursuant to another aspect of the present invention, the lower pan part and the upper pan part are in effective heat transmitting contact with one another over an area which is at least 20% of the total area of the upper pan. More preferably, the lower pan part and the upper pan part are in effective heat transmitting contact with one another over an area which is at least 40% of the total area of the upper pan. Most preferably, the lower pan part and the upper pan part are in effective heat transmitting contact with one another over an area which is at least 70% of the total area of the upper pan. Generally, besides at the central, raised area of the lower pan, heat transmitting contact between the upper pan part and the lower pan part takes place along the periphery of the upper pan part. That periphery may coincide largely with the periphery of the lower pan part. Alternatively, the periphery of the upper pan part may be disposed along more centrally located raised areas of the lower pan part, for example, along an endless ridge or bead which extends around the lower pan part in spaced relation to the periphery of the lower pan part.

Pursuant to a supplemental aspect of the present invention, the raised area of the lower pan is provided with at least one opening, while the upper pan is provided with at least one opening substantially aligned with the opening in the raised area of the lower pan so as to permit air flow from a region below the lower pan part to a region above the upper pan part. This air flow path through the pan facilitates convection heating of a food article disposed on the upper pan part in an oven.

The lower pan part may be provided with a plurality of recesses, with the raised area of the lower pan part separating the recesses from one another. In that case, the upper pan part is provided with a first set of perforations communicating with one of the recesses and a second set of perforations communicating with another of the recesses. This configuration allows for differential steaming of different food articles placed on the upper pan part over the first set of perforations and the second set of perforations. For example, one of the food articles may be supplied with steam for a shorter period than one or more other food articles by having a smaller amount of water placed in the respective recess in the lower pan part.

The first set of perforations may be disposed in an array having a first configuration and the second set of perforations may be concomitantly disposed in an array having a second configuration geometrically different from the first configuration. Differing configurations of perforation arrays are advantageous where the respective food articles received atop the upper pan part have different shapes corresponding to or matching the differing configurations of perforation arrays.

A plurality of different lids or covers may be provided, with a first lid being disposed on the upper pan part so as to cover only the first set of perforations, and with a second lid being disposed on the upper pan part so as to cover only the second set of perforations. Thus, different moisture schedules may be applied to food articles of different types placed on the upper pan part.

According to another feature of the present invention, the upper pan part is formed of two separable portions, the first set of perforations being located in one of the pan portions, the second set of perforations being located in another of the portions. This enables a user to remove, from an oven, one of the pan portions with its respective food article(s) and optionally with a respective lid or cover prior to removal of other food articles.

As discussed hereinabove with reference to the method of the invention, the raised area of the lower pan part may be provided with at least one opening aligned with an opening in the upper pan part, thereby permitting air flow from a region below the lower pan part to a region above the upper pan part, thereby facilitating convection heating of a food article disposed on the upper pan part in an oven.

In a specific embodiment of the pan of the present invention, the lower pan part is elongate and provided with a multiplicity of transversely extending elongate ridges defining a multiplicity of elongate recesses. The upper pan part is formed with a depression overlying the recesses and is provided in the depression with a plurality of perforations. In this specific embodiment, the raised area of the lower pan part is a continuous or endless area extending around the ridges and the recesses. The raised area of the lower pan part is provided with openings aligned with respective openings in the upper pan part, so as to permit air flow substantially vertically through the pan from a region below the lower pan part to a region above the upper pan part, thereby facilitating convection heating of a food article disposed on the upper pan part in an oven. The upper pan part is optionally provided with a pair of peripheral regions on opposite sides of the perforated depression, where the depression is separated from the peripheral regions by raised areas to define recesses in the peripheral regions, whereby a food item may be placed on the depression and water may be deposited in the peripheral regions.

In another embodiment of a baking pan in accordance with the present invention, the lower pan part is provided with a plurality of raised areas spaced from one another throughout a common reservoir or water-receiving recess. These raised areas are like islands in a lake, when the reservoir or recess is filled with water. The islands may extend, for instance, in a linear array along a longitudinal axis of an elongate lower pan part.

In another embodiment of a baking pan in accordance with the present invention, one or both of the lower pan part and a cover are provided with embedded electrical heating wires. One or two heat resistant electrical connectors are mounted to the lower pan part and/or the cover for enabling operative coupling of the wiring networks with a source of electrical current. At least one temperature sensor may be provided on the cover or the lower pan part for automatically monitoring the temperature and providing temperature feedback for regulating the amount of electrical current supplied to the wiring networks.

A cooking method in accordance with yet another embodiment of the present invention utilizes a baking pan including a lower pan part and an upper pan part connected to one another, the upper pan part being provided with a first set of perforations in a first array and a second set of perforations in a second array, the second array being spaced from the first array, the lower pan part having a first recess communicating with the first set of perforations, the lower pan part also having a second recess communicating with the second set of perforations. In this method, a first amount of water is deposited in the first recess and a second amount of water is deposited in the second recess. A first food item is disposed on the upper pan part over at least some of the first set of perforations, while a second food item is disposed on the upper pan part over at least some of the second set of perforations. The baking pan, the first food item, the second food item, the first amount of water, and the second amount of water are all placed in a heated enclosure. Thereafter the first amount of water and the second amount of water are converted to steam. Steam from the first amount of water is applied to a lower surface of the first food item via the first set of perforations, whereas the steam from the second amount of water is applied to a lower surface of the second food item via the second set of perforations. One of the first food item and the second food item is removed from the heated enclosure after the conversion to steam of essentially all of the respective one of first amount of water and the second amount of water. Thereafter the other of the first food item and the second food item is subjected to only baking in the heated enclosure.

According to a modification of this method, a first lid is positioned on the upper pan part over the first food item and the first set of perforations to define a first chamber containing the first food item and communicating with the first recess via the first set of perforations. A second lid is positioned on the upper pan part over the second food item and the second set of perforations to define a second chamber containing the second food item and communicating with the second recess via the second set of perforations. The first lid and the second lid are placed in the heated enclosure together with the baking pan, the first food item, the second food item, the first amount of water, and the second amount of water. Upon elapse of a period of time after placement of the lids in the heated enclosure together with the baking pan, the food items, and the water, one of the lids is removed from the heated enclosure together with the respective food item.

In a further modification of this method, where the upper pan part is formed of two separable portions each incorporating a respective set of the perforations, the method further comprises removing one of the lids from the heated enclosure together with the respective food item.

In yet another modification of the this method of the invention, the one food item is subjected to only baking in the heated enclosure after the conversion to steam of essentially all of the respective amount of water and prior to removing the one food item from the heated enclosure.

BRIEF DESCRIPTION OF THE DRAWINGS

FIG. 1 is an exploded perspective view of a baking pan, showing an upper pan portion and a lower pan portion of the baking pan.

FIG. 2 is an exploded perspective view of a modified baking pan, showing an upper pan portion and a lower pan portion similar to those shown in FIG. 1.

FIGS. 5A and 5B are perspective views of the baking pan of FIG. 1, showing an elongate piece of dough and a corresponding baked loaf of bread, respectively, positioned on the pan.

FIGS. 6A and 6B are perspective views of the baking pan of FIG. 2, respectively showing four pieces of dough and corresponding baked rolls or buns placed on the baking pan.

FIG. 14 is a diagram showing the interrelationship of the upper pan portion and the lower pan portion of FIG. 13 in an assembled state.

FIGS. 15–21 and 23 show respective baking pan parts utilizable with the upper pan portion and the lower pan portion of FIG. 13, to enable the cooking of different kinds of foodstuffs pursuant to different baking and/or steaming processes.

FIG. 15 is a schematic isometric view of a first baking pan panel connectable to the upper pan portion of FIG. 13 so as to essentially cover one of the openings thereof.

FIG. 16 is a schematic isometric view of a second baking pan panel connectable to the upper pan portion of FIG. 13 so as to essentially cover one of the openings thereof.

FIG. 17 is a schematic isometric view of a third baking pan panel connectable to the upper pan portion of FIG. 13 so as to essentially cover one of the openings thereof.

FIG. 18 is a schematic isometric view of a casserole-type baking pan part connectable to the upper pan portion of FIG. 13 so as to essentially cover one of the openings thereof.

FIG. 19 is a schematic isometric view of a baking pan panel connectable to the upper pan portion of FIG. 13 so as to essentially cover both of the openings thereof.

FIG. 20 is a schematic isometric view of a further baking pan panel connectable to the upper pan portion of FIG. 13 so as to essentially cover both of the openings thereof.

FIG. 21 is a schematic isometric view of yet another baking pan panel connectable to the upper pan portion of FIG. 13 so as to essentially cover both of the openings thereof.

FIG. 23 is a diagram of a steamer-type pan part connectable to the upper pan portion of FIG. 13 so as to essentially cover both of the openings thereof.

FIG. 27 is a top plan view of an upper pan portion or docking pan cooperating with the lower pan portion illustrated in FIGS. 24–26.

FIG. 28 is a side elevational view of the upper pan portion of FIG. 27.

FIG. 29 is a cross-sectional view taken along line IXXX—IXXX in FIG. 27.

FIG. 30 is a top plan view of a pan part or food pan connectable to the upper pan portion of FIGS. 27–29.

FIG. 31 is a side elevational view of the pan part of FIG. 30.

FIG. 32 is a cross-sectional view taken along line XXXII—XXXII in FIG. 30.

FIG. 33 is a top plan view of another pan part or food pan connectable to the upper pan portion of FIGS. 27–29.

FIG. 34 is partially a side elevational view of the pan part of FIG. 33 and partially a cross-sectional view taken along line XXXIV—XXXIV in FIG. 33.

FIG. 35 is a partial cross-sectional view taken along line XXXV—XXXV in FIG. 33.

FIG. 36 is a diagrammatic cross-sectional view of a generic pan part or panel connected to generic upper pan portion.

FIG. 37 is a top plan view of an upper pan portion utilizable for baking cookies.

FIG. 38 is a cross-sectional view taken along line XXXVIII—XXXVIII in FIG. 37, showing the upper pan portion of FIG. 37 attached to a lower baking pan portion.

FIG. 39 is a top plan view of another upper pan portion utilizable for baking egg rolls, pizza pockets and alike.

FIG. 40 is a cross-sectional view taken along line XL—XL in FIG. 39.

FIG. 52 is a schematic top view of yet another baking pan in accordance with the present invention.

FIG. 53 is a schematic side elevational view of the baking pan of FIG. 52.

DESCRIPTION OF THE PREFERRED EMBODIMENTS

Figure 3:
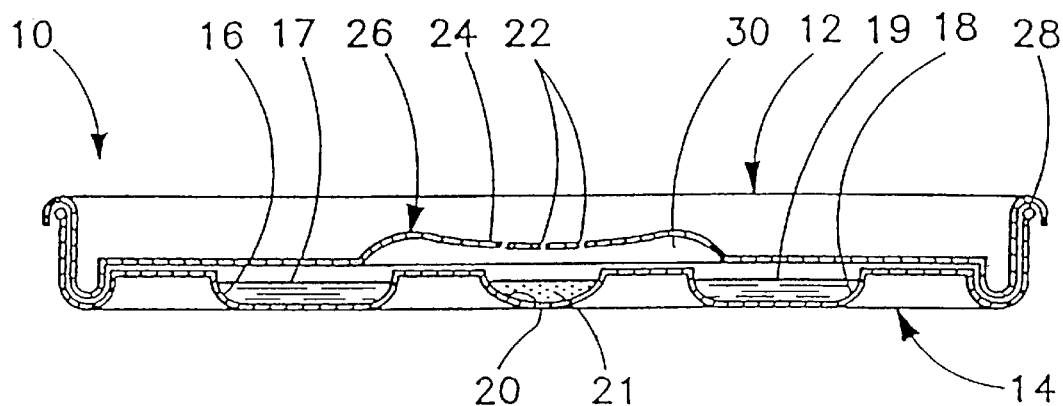
FIG. 3 is a schematic transverse cross-sectional view of the baking pan of FIG. 1, in an assembled configuration.
Figure 4:
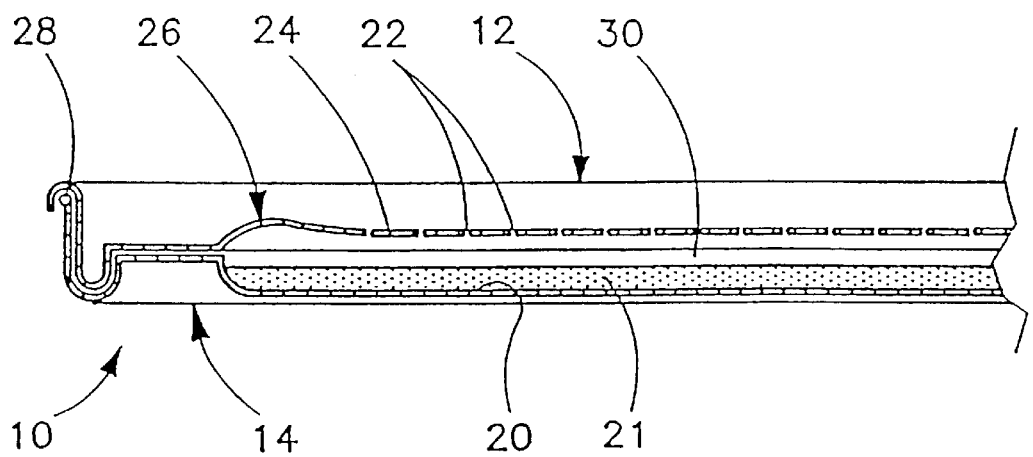
FIG. 4 is a schematic longitudinal cross-sectional view of the baking pan of FIG. 1, in an assembled configuration.

As illustrated in FIGS. 1, 3 and 4, a baking pan 10 comprises an upper pan portion or plate 12 and a lower pan portion or plate 14. Pan portions 12 and 14 can be made of metal such as stainless steel, aluminum, silver coated brass or non-sticky alloys. Lower pan portion 14 has two substantially hemispherical grooves or recesses 16 and 18. Recesses 16 and 18 receive a fixed amount of water 17, 19 (FIG. 3) before baking starts. The depths, diameters and lengths of recesses 16 and 18 may vary in accordance with the intended application, for example, the type and size of the dough product to be baked.

Lower pan portion 14 is also provided with an auxiliary groove or recess 20 for receiving a flavoring composition 21 (FIGS. 3 and 4) which includes a conventional flavoring agent dispersed or dissolved in water or cooking oil or provided in powder form. The flavoring composition 21 may be disposed in recess 20 in prepackaged bags or small aluminum pans (not shown).

Upper pan portion 12 defines a substantially horizontal baking surface provided with a multiplicity of perforations 22 disposed in an array substantially conforming in size and shape to a loaf of bread. As shown particularly in FIGS. 3 and 4, perforations 22 are disposed in an elongate depression 24 formed in an elongate raised portion 26 of upper pan portion 12. As further shown in FIGS. 3 and 4, upper pan portion 12 and lower pan portion 14 are releasably connected to one another along a peripheral bead-and-groove sealing coupling 28. In the assembled configuration of FIGS. 3 and 4, pan portions 12 and 14 define a substantially sealed steam generation chamber 30 which communicates with recesses 16, 18 and 20 on a lower side and with perforations 22 on an upper side.

Perforations 22 are mostly very small, on the order of the diameter of a ballpoint pen's writing ball. Perforations 22 must be small enough to prevent dough on upper pan portion 12 from falling into the perforations. Generally, as indicated in the drawings, perforations 22' in the center of the perforation array may be somewhat larger than those at the periphery, to enable a greater flow rate of steam into the center of piece of dough.

FIG. 2 illustrates a modification of the baking pan of FIGS. 1, 3 and 4 wherein upper pan portion 12 is replaced by an upper pan portion 32 having four disk-shaped arrays of perforations 34a, 34b, 34c, 34d disposed in a linear configuration. Perforations 34a, 34b, 34c, 34d may be provided in raised portions 36a, 36b, 36c, 36d of pan portion 32. Again, perforations (not designated) in the central areas of the disk-shaped perforation arrays may be slightly larger (2–3 times as large) than the perforations 34a, 34b, 34c, 34d at the peripheries.

FIG. 5A and 5B depict two successive stages in the baking of a loaf of bread 40 from an elongate piece of dough 38. After the placement of a predetermined aliquot of water 17, 19 in recesses 16 and 18 (see FIG. 3) and, optionally, the disposition of a flavoring composition 21 in recess 20 (FIGS. 3 and 4), pan portions 12 and 14 are connected to one another. Dough piece 38 is then positioned centrally on an upper surface (not designated) of upper pan portion 12 so that the dough covers essentially all of the perforations. Supporting the dough 38 on its uppermost surface, baking pan 10 is then placed into a heated enclosure or oven having a preselected temperature.

During an initial phase of a baking cycle, steam is generated in chamber 30 and escapes through perforations 22. Steam enters the dough through the perforations 22 and 22', thereby assisting in the cooking of the interior portion of the dough and maintaining the interior dough at an enhanced moisture level. In addition, steam bathes a lower horizontal surface (not designated) of dough 38 and leaks from between the dough and the upper pan portion to moisten the lower lateral surfaces of dough 38. The escaping steam is effective to moisten approximately the lower one-fourth of the lateral surface of dough 38. The moistening of the lower surfaces of dough 38 with steam prevents a browning or hardening of those surfaces during the initial baking phase, thereby enabling a greater degree of dough expansion.

Generally, the amount of water placed into recesses 16 and 18 is just sufficient to generate steam during approximately ten minutes (or about one-third) of a thirty minute baking process. If recesses 16 and 18 can hold a greater amount of water, fill lines (not shown) may be provided to indicate the recommended amount of water to be added for steam generation.

A second phase of the baking process begins when the water in recesses 16 and 18 has been exhausted. During that second phase, the lower surfaces of the bread 40 brown and harden. Because the heat transferred to the dough is greater at the baking pan than along the upper surfaces of the dough, the browning and hardening of the lower surfaces catches up to and substantially matches the browning and hardening of the upper surfaces by the end of the baking process. In any event, because of the delay in the baking of the lowermost, horizontal surface of the dough, that surface is lighter and softer in the final baked loaf 40, in comparison with conventional baking procedures.

FIG. 6A and 6B illustrate the use of the baking pan of FIG. 2 and show upper surfaces of raised portions 36a, 36b, 36c, 36d supporting respective lumps of dough 42a, 42b, 42c, 42d. Again, essentially all perforations 34a, 34b, 34c, and 34d are covered at the beginning of the baking process. The baking process proceeds as discussed above with reference to FIGS. 5A and 5B.

It is to be noted that in the baking pans of FIGS. 1 and 2, recesses 16 and 18 are laterally staggered with respect to raised portion 26 of pan portion 12 and raised portions 36a, 36b, 36c, 36d of pan portion 32. As best seen in FIG. 3, this relative lateral positioning forces the steam generated from water 17 and 19 to flow along a channel between heated surfaces of upper pan portion 12 or 32 and lower pan portion 14 prior to ejection via perforations 22 and 22' or 34a, 34b, 34c, 34d. The heat transfer enabled by this contact between the steam and the heated surfaces of upper pan portion 12 or 32 and lower pan portion 14 superheats the steam and enhances the improved baking process described herein, particularly for chemically leavened dough.

Figure 7A:
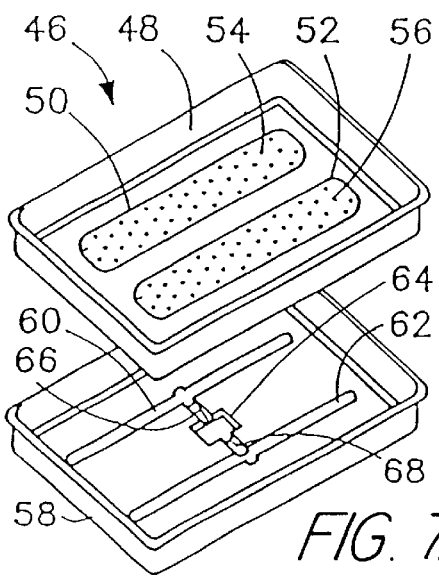
FIGS. 7A–7D show successive steps in the use of another baking pan.
Figure 7B:
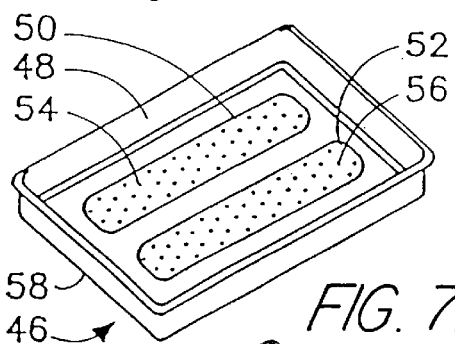
Figure 10:
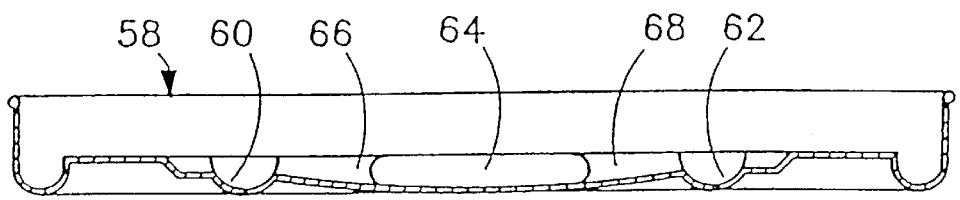
FIG. 10 is a transverse cross-sectional view of a lower pan portion or plate of the baking pan of FIGS. 7A–7B, taken along a geometric center line.
Figure 11:
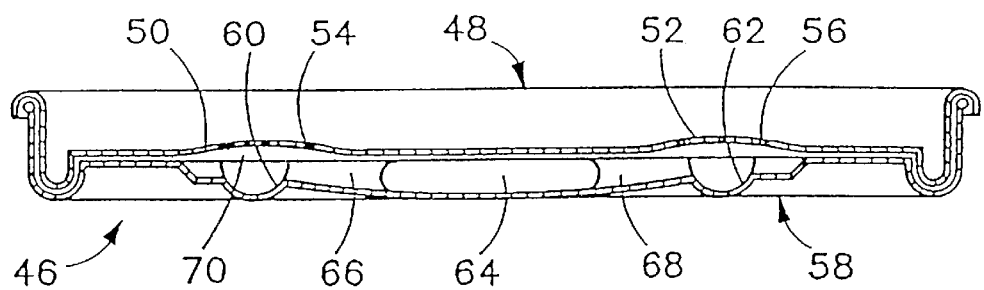
FIG. 11 is a transverse cross-sectional view of the assembled baking pan of FIGS. 7A–7B, taken along a geometric center line.

FIGS. 7A–7B illustrate successive steps in a baking process using a modified baking pan 46 which enhances the baking process for yeast leavened dough. As shown in FIGS. 7A, 7B, 9 and 11, pan 46 includes an upper pan portion or plate 48 having a pair of elongate raised portions 50 and 52 each provided with an elongate array of perforations 54 and 56. Pan 46 also includes a lower pan portion or plate 58 (FIGS. 7A, 10 and 11) having parallel water-receiving grooves or recesses 60 and 62 connected to a central flavoring-receiving recess 64 via respective channels 66 and 68. As shown in FIGS. 7A, 10 and 11, channels 66 and 68 taper from a maximum transverse cross-sectional area at recess 64 to minimum transverse cross-sectional area at recesses 60 and 62.

Figure 7C:
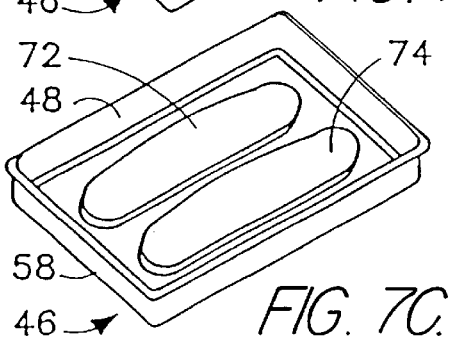
Figure 8C:
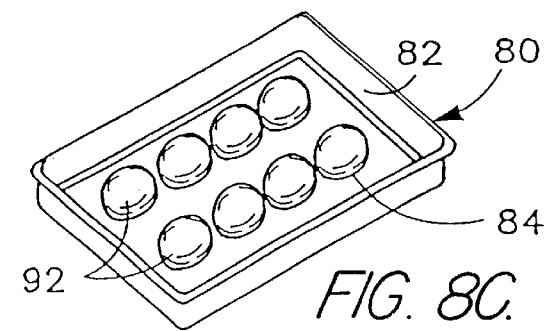
Figure 7D:
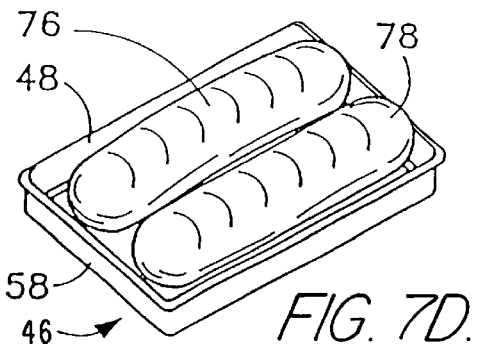

Upon a filling of recesses 60 and 62 with water to predetermined fill levels and upon the optional placement of a flavored composition into recess 64, pan portions 48 and 58 are connected to one another, as illustrated in FIGS. 7B and 11 to define a steam generation chamber 70. Pieces of dough 72 and 74 are placed on upper surfaces (not designated) of raised portions 50 and 52 so that essentially all perforations 54 and 56 are covered, as indicated in FIG. 7C. Baking then proceeds as discussed above with reference to FIGS. 5A and 5B to produce baked loaves 76 and 78 (FIG. 7D).

Channels 66 and 68 are designed so that vaporized flavor compounds can move from recess 64 to recesses 60 and 62, but the water would not flow from recesses 60 and 62 to recess 64.

The upper and lower pan portions of a baking pan as described herein should be connected to one to form an effective steam seal for purposes of guiding steam and vaporized flavor compounds through the perforations provided in the upper pan portion. Generally, the right amount of water is automatically controlled by the capacity of the water-receiving recesses or controlled by the use of fill lines.

Figure 8A:
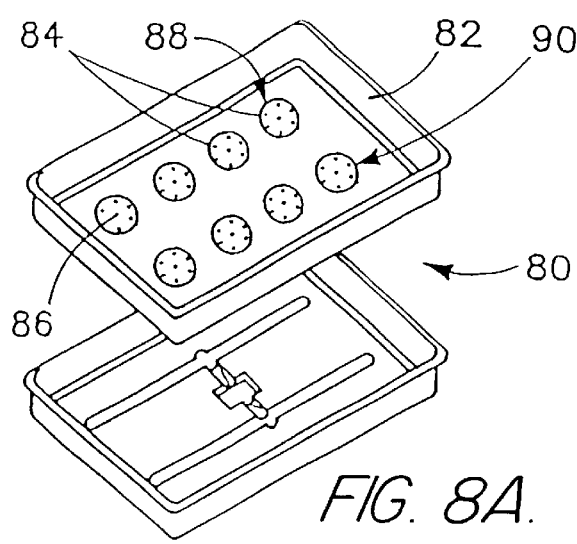
FIGS. 8A–8D show successive steps in the use of yet another baking pan.
Figure 8B:
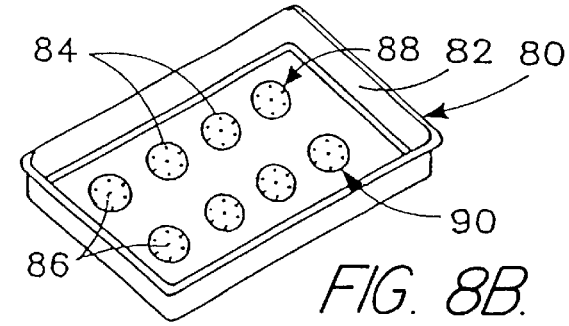
Figure 8D:
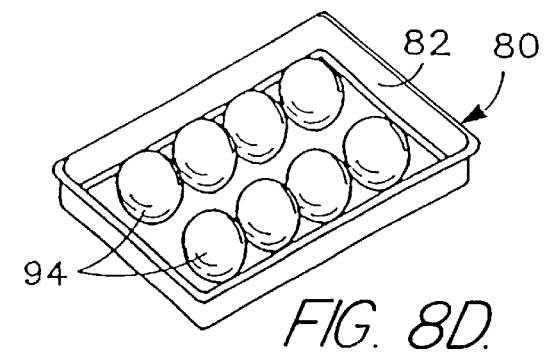
Figure 9:
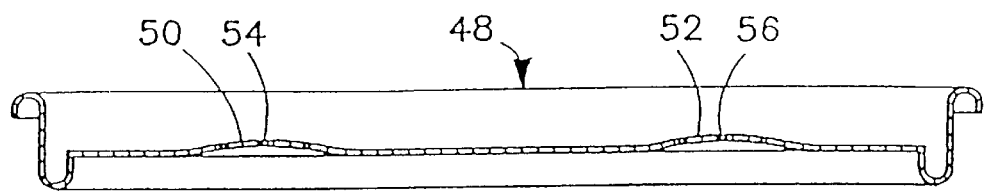
FIG. 9 is a transverse cross-sectional view of an upper pan portion or plate of the baking pan of FIGS. 7A–7B, taken along a geometric center line.

FIGS. 8A–8B illustrate successive steps in a baking process using yet another baking pan 80. Pan 80 is identical to pan 46 except that upper pan portion 48 is replaced by a pan portion 82 having a plurality of circular raised areas 84 provided with perforations 86 and arranged in two linear arrays 88 and 90 over water-receiving recesses 60 and 62. Upon a filling of recesses 60 and 62 with water to predetermined fill levels and upon the optional placement of a flavored composition into recess 64, pan portions 80 and 58 are connected to one another, as illustrated in FIGS. 8B. Pieces of dough 92 are placed on upper surfaces (not designated) of raised areas 84 so that essentially all perforations 86 are covered. Baking then proceeds as discussed above with reference to FIGS. 5A and 5B to produce baked rolls or buns 94 (FIG. 8D).

Figure 12:
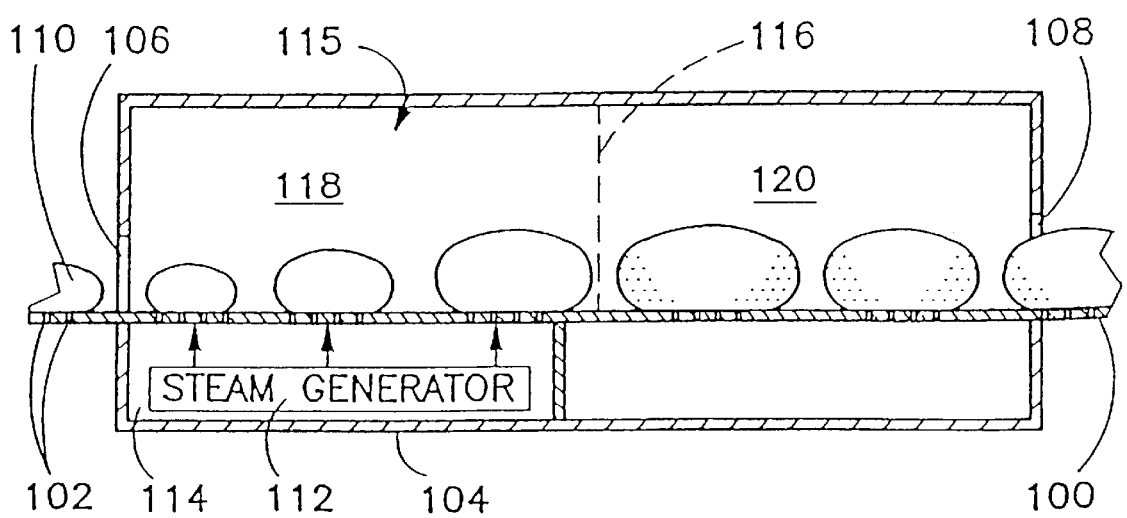
FIG. 12 is a schematic longitudinal cross-sectional view of a continuous-process baking oven.

FIG. 12 illustrates a continuous baking process utilizing principles disclosed above with respect to batch type baking processes. A conveyor 100 with a plurality of interspaced arrays of perforations 102 extends through a heat enclosure or oven 104 from an entrance opening 106 to an exit opening 108. Outside of oven 104, pieces of dough 110 are placed on conveyor 100 over each array of perforations 102 so that essentially all the perforations of each array are covered.

Oven 104 is provided with steam generation means 112 in a steam generation chamber 114 below conveyor 100. Chamber 114 extends continuously along a predetermined distance under conveyor 100, generally along approximately the first one-third of the distance between entrance opening 106 and exit opening 108, thereby providing steam to perforations 102 along that stretch of the conveyor. Oven 104 also has a baking chamber 115 defined along a lower boundary by conveyor 100. A compartmentalizer or divider 116 such as a flexible partition is provided for operatively dividing baking chamber 115 into a more humid first baking zone 118 and an essentially dry second baking zone 120 disposed downstream of the first baking zone. Thus, gaseous water enters first baking zone 118 by leaking from beneath the dough pieces 110. As discussed above, this leaking steam is effective to moisten only the lower portions of the pieces of dough 110. Steam generation means 112 may comprise a series of spray nozzles which eject an aqueous mist into chamber 114 which is sufficiently heated to convert the water spray into steam.

The functions of steam in a baking process as described hereinabove are:

(1) to provide the interior region with a faster heat transfer rate; the interior can be fully gelatinized and expanded before the crust is developed, and therefore, avoiding undercooking of the interior and resulting a high baked specific volume.

(2) to further increase the baked specific volume through the ballooning effect; since the pressure of steam is higher than the atmospheric pressure, the steam would force the dough to expand in every direction besides the bottom due to the unique curvature of the perforated area of the upper pan.

(3) to retain the moisture of the interior region of a baked dough product; due to the continuous evaporation and condensation of the steam, the interior would retain 2–3% higher moisture content than that baked conventionally. The higher moisture content would keep the finished product softer and fresher for a longer period of time.

(4) to avoid overbaking of the bottom crust; due to the continuous flow of steam when there is water remaining in the water recesses, the bottom temperature is near 212° F. rather than the oven temperature during the early stage of baking. When the water is completely vaporized, the temperature of the baking pan would reach the oven temperature. The combination of low and high temperatures would allow the development of the desired bottom crust without overheating. When too much water is used, the bottom crust might not be formed properly, it is therefore necessary to adjust the amount of water according to the type and size of a dough product.

(5) to provide more uniform pore size distribution and shape of a finished product; since the gelatinization of the starch is completed before the crust is fully developed, burgeon can be avoided.

FIGS. 13–23 together illustrate a baking pan kit having a versatility and interchangeability of parts which enables multifarious alternative uses in steaming and baking different kinds of foodstuffs. The kit comprises a lower pan portion 130 and an upper pan portion 132 illustrated in FIGS. 13 and 14 and farther comprises one or more parts illustrated in FIGS. 15–23. These parts provide support surfaces for various foodstuffs and are alternatively connectable to upper pan portion 132 over one or both openings 134 and 136 provided in upper pan portion 132.

Figure 13:
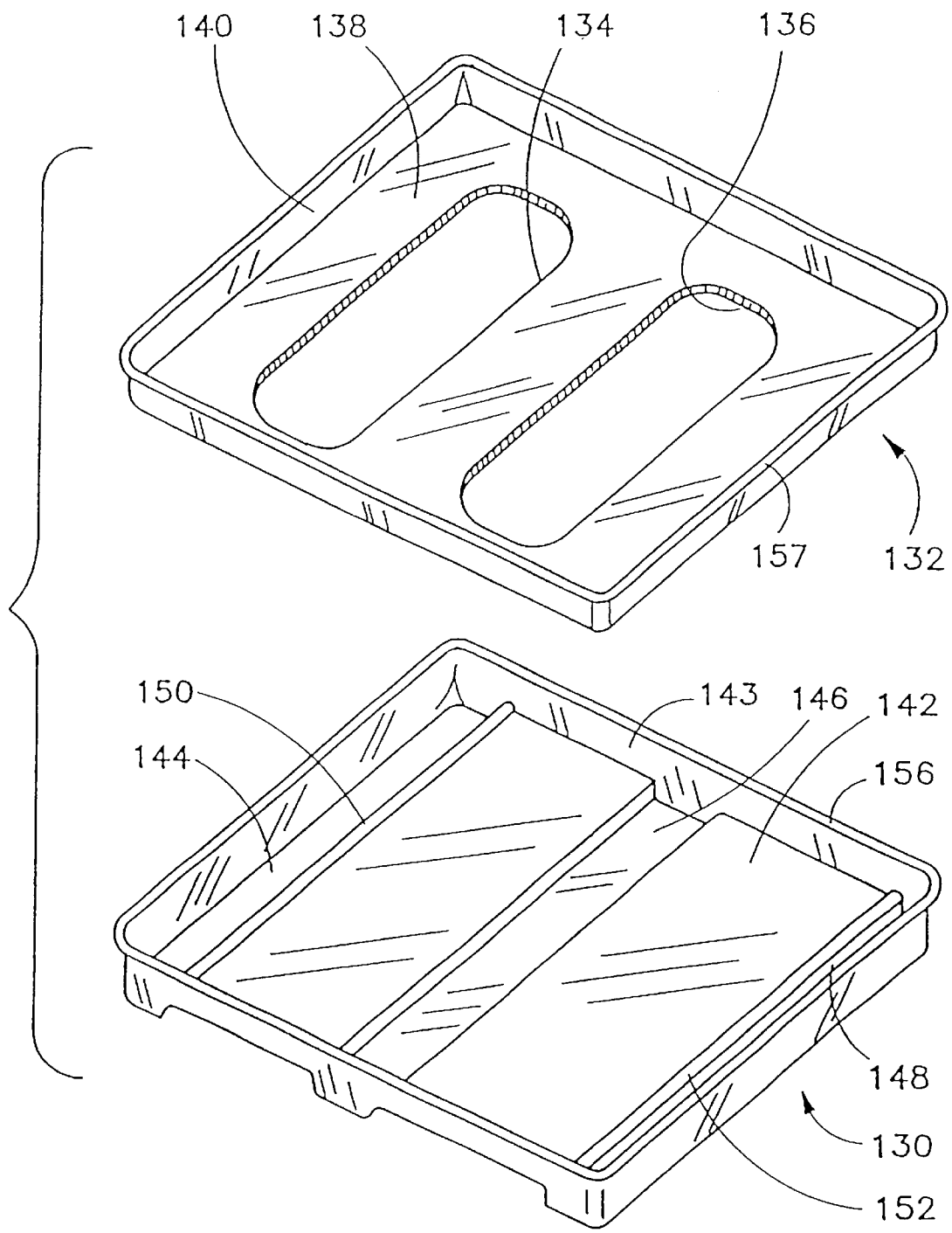
FIG. 13 is an isometric exploded view of two parts of a baking pan kit, showing an upper pan portion with a pair of openings and a lower pan portion with elongate recesses.

As additionally illustrated in FIGS. 13 and 14, openings 134 and 136 are formed in a plate 138 of upper pan portion 132. Plate 138 is surrounded by an upwardly turned flange 140. Openings 134 and 136 are elongate, generally parallel and surrounded by continuous, imperforate portions of plate 138.

Lower pan portion 130 includes a lower plate 142 surrounded by a perimetric wall 143 and provided with three elongate spaced recesses 144, 146 and 148. Recesses 144, 146 and 148 extend parallel to one another and are laterally staggered relative to openings 134 and 136 when upper pan portion 132 is attached to lower pan portion 130, as depicted schematically in FIG. 14. Plate 142 is formed with elongate beads or ridges 150 and 152 alongside recesses 144 and 148 for deepening those recesses. As discussed hereinabove with reference to recesses 16, 18 and 20, recesses 144 and 148 receive a fixed amount of water before cooking with the baking kit commences. Groove or recess 146 preferentially receives a flavoring composition which includes a conventional flavoring agent dispersed or dissolved in water or cooking oil or provided in powder form. The flavoring composition may be disposed in recess 146 in prepackaged bags or small aluminum pans (not shown). Where flavor additives are not desired, recess 146 may be left empty or provided with water.

Preferably, water (and a flavoring composition) is disposed in recesses 144 and 148 (and 146) prior to an attachment of lower baking pan portion 130 to upper baking pan portion 132, as indicated in FIG. 14. Except for openings 134 and 136, lower pan portion 130 and upper pan portion 132 define a closed steam generation chamber 154. Pan portions 130 and 132 are connected to one another along their peripheries in an effectively steam-proof seal. To that end, perimetric wall 143 is provided with bead 156 which is received in an outwardly extending U- or C-shaped extension 157 of flange 140.

In most cooking operations utilizing the kit of FIGS. 13–23, openings 134 and 136 are blocked by a part illustrated in FIGS. 15–23. This blocking or covering of openings 134 and 136 serves to complete the closure of chamber 154 and facilitate the generation of pressurized steam in that chamber.

FIGS. 15–18 illustrate respective baking kit parts or panels 158, 160, 162, and 164 each of which is connectable to upper pan portion 132 at either opening 134 or 136 in an effectively steam-proof seal. Panel 158 is provided with an elongate array 166 of perforations 168 and is adapted for the steaming and baking of a loaf of bread, while panel 160 is formed with a plurality of generally oval arrays 170 of perforations 172 and is adapted for the steam baking of several biscuits, rolls, muffin, etc. Panel 162 is a solid plate and is used either for merely closing an opening 134 or 136 or for providing a flat surface for certain types of baking procedures, e.g., for the baking of cookies. Each panel 158, 160, and 162 is provided with handles 174, 176, and 178 for facilitating manipulation and with a downwardly facing projection 180, 182 and 184 which alternatively fits into openings 134 and 136 in an effectively steam-proof seal.

Baking kit part 164 takes the form of a meat-loaf baking pan provided in a lower wall or panel 186 with a multiplicity of perforations 188 in a closed spaced array. Lower wall or panel 86 is provided with a projection similar to projections 180, 182 and 184 for mating with opening 134 or 136 in an effectively steam-proof seal.

FIGS. 19–21 illustrate respective baking kit parts or panels 190, 192, and 194 each of which is connectable to upper pan portion 132 at both openings 134 and 136 in an effectively steam-proof seal. Projections 196 and 198 on a lower side of panel 190 mate with openings 134 and 136, respectively, in a effectively steam-tight fit. Similarly, projections 200 and 202 are provided on a bottom surface of panel 192 for fitting in a sealing manner into openings 134 and 136, respectively. Panel 194 has projections 204 and 206 receivable in openings 134 and 136 in steam-proof fits.

Panel 190 is provided with two rows 208 and 210 of perforations 212 and 214. The perforations 212 and 214 are arranged in spaced, generally rectangular arrays 216 and 218 in each row 208 and 210. Rows 208 and 210 are coextensive with openings 134 and 136 when panel 190 is disposed on upper pan portion 132. Panel 190 is useful for cooking foodstuffs such as egg rolls, elongate biscuits or dough products with fillings.

Panel 192 has two circular sections 220 and 222 of perforations 224 disposable over openings 134 and 136 in upper pan portion 132. Panel 192 is further provided with a plurality of spaced, parallel grooves 226 extending from perforations 224 in one section 220 to perforations in the other section 222. Panel 192 enables the delivery of steam to the lower surface of a disk of dough as in a pizza.

Panel 194 is a solid plate and is used for providing a flat surface for certain types of baking procedures, e.g., for the baking of cookies. In this case, no water is deposited into recesses 144, 146, or 148 prior to the assembly of lower pan portion 130 and upper pan portion 132 to one another. The sealed chamber 154 formed by lower pan portion 130, upper pan portion 132, and panel 194 serves as a thermally insulating space which reduces the transfer of heat to the lower surfaces of dough pieces placed on panel 194, thereby preventing the overcooking or burning of the cookies.

Panels 190, 192, and 194 provided with handles 228, 230, and 232 for facilitating manipulation.

Figure 22:
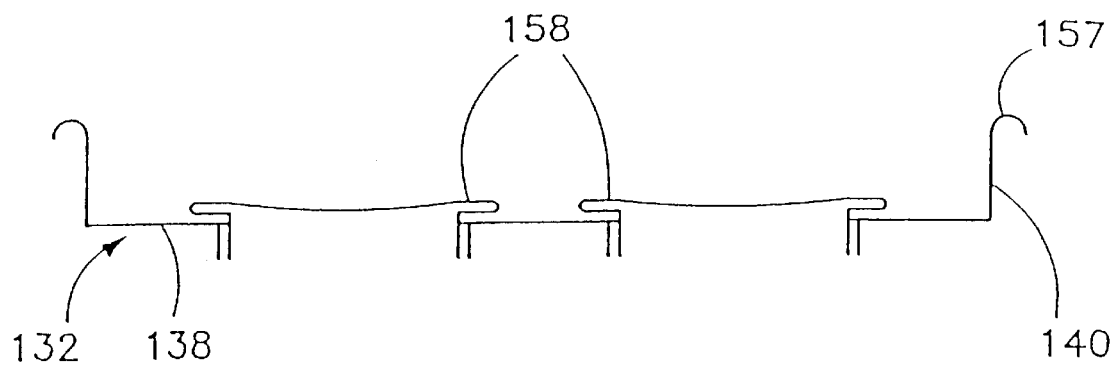
FIG. 22 is a diagram showing two baking pan panels as shown in FIG. 15 connected to the upper pan portion of FIGS. 13 and 14.

FIG. 22 depicts two baking pan panels 158 (FIG. 15) connected to upper pan portion 132 of FIGS. 13 and 14. Panels 158 are formed with depressions, as concave surfaces, as discussed hereinabove with reference to FIGS. 3 and 4 (see reference designation 24).

Figure 23:
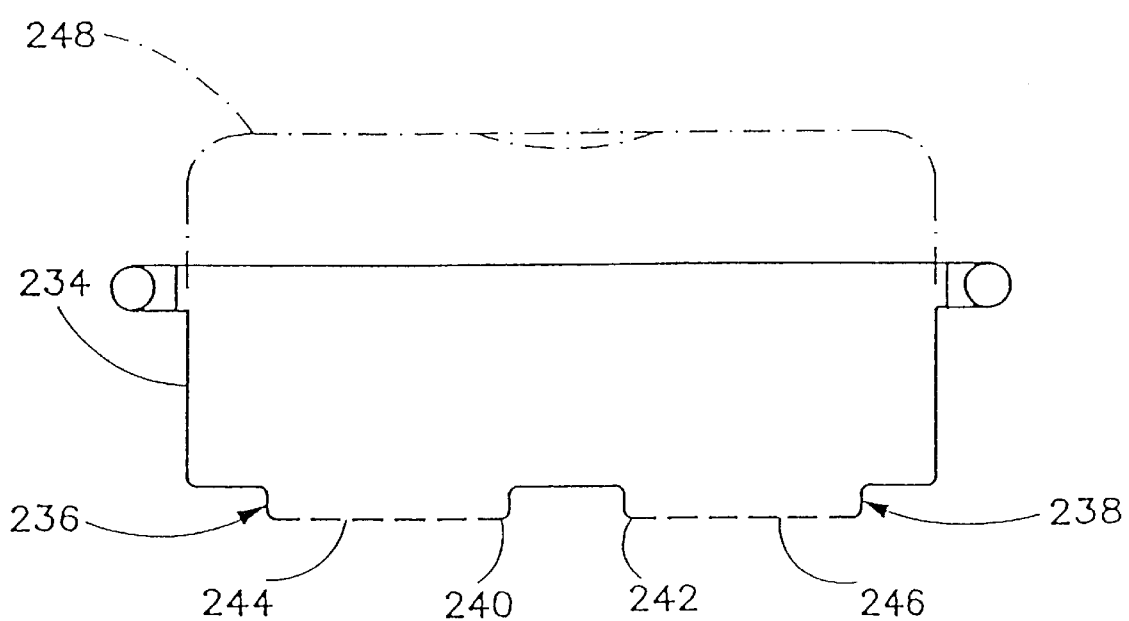

FIG. 23 illustrates a steamer-type pan part 234 connectable to upper pan portion 132 of FIG. 13 so as to essentially cover both of the openings 134 and 136 thereof. Pan part 234 is provided with two elongate projections 236 and 238 insertable in effectively steam-tight fits into openings 134 and 136, respectively. Lower walls or surfaces 240 and 242 of projections 236 and 238 are formed with perforations 244 and 246, respectively. A cover 248 may be provided from forming an enclosed chamber receiving vegetables or other food stuffs to be subjected to a steam cooking process.

Each baking kit part or panel 158, 160, 162, 164, 190, 192, 194, and 234 defines a support surface on which a foodstuff is deposited at the onset of a steaming and/or baking process. When baking kit part 158, 160, 164, 190, 192, or 234 is used, the foodstuff is generally placed over the perforation array(s) provided in the part or panel. After the placement of a predetermined aliquot of water in recesses 144 and 148 (see FIG. 13) and, optionally, the disposition of a flavoring composition in recess 146, baking pan portions 130 and 132 are connected to one another. Two baking pan parts selected from among parts 158, 160, 162, and 164 or a single part selected from among parts 190, 192, and 234 is connected to upper pan portion 132, either before or after the coupling of pan portions 130 and 132. A food item such as a piece of dough is then positioned on an upper surface of the selected panel 158, 160, 162, 164, 190, 192, or 234 so that the dough covers an array of perforations. Supporting the dough on its uppermost surface, the assembled baking pan is then placed into a heated enclosure or oven having a preselected temperature. Subsequently, steam is generated in chamber 154 and escapes through the perforations in the selected panel 158, 160, 162, 164, 190, 192, or 234. The cooking of the foodstuff, particularly dough, proceeds as described in detail above.

The terms "steam-tight" and "steam-proof" are used herein to designate a coupling or seal which is effective to enable the guiding of steam from a steam-generation chamber through perforations in an upper pan portion or panel of a baking pan or kit to the lower surface of a food article placed over the perforations. The fit or coupling between upper and lower pan portions or between a panel and an upper pan portion need not be absolutely tight; there may be some steam leakage around the joints in the baking pan or assembled baking pan kit. However, the leakage is not so large as to prevent the delivery of an effective amount of steam to the lower surface of a food article.

Figure 24:
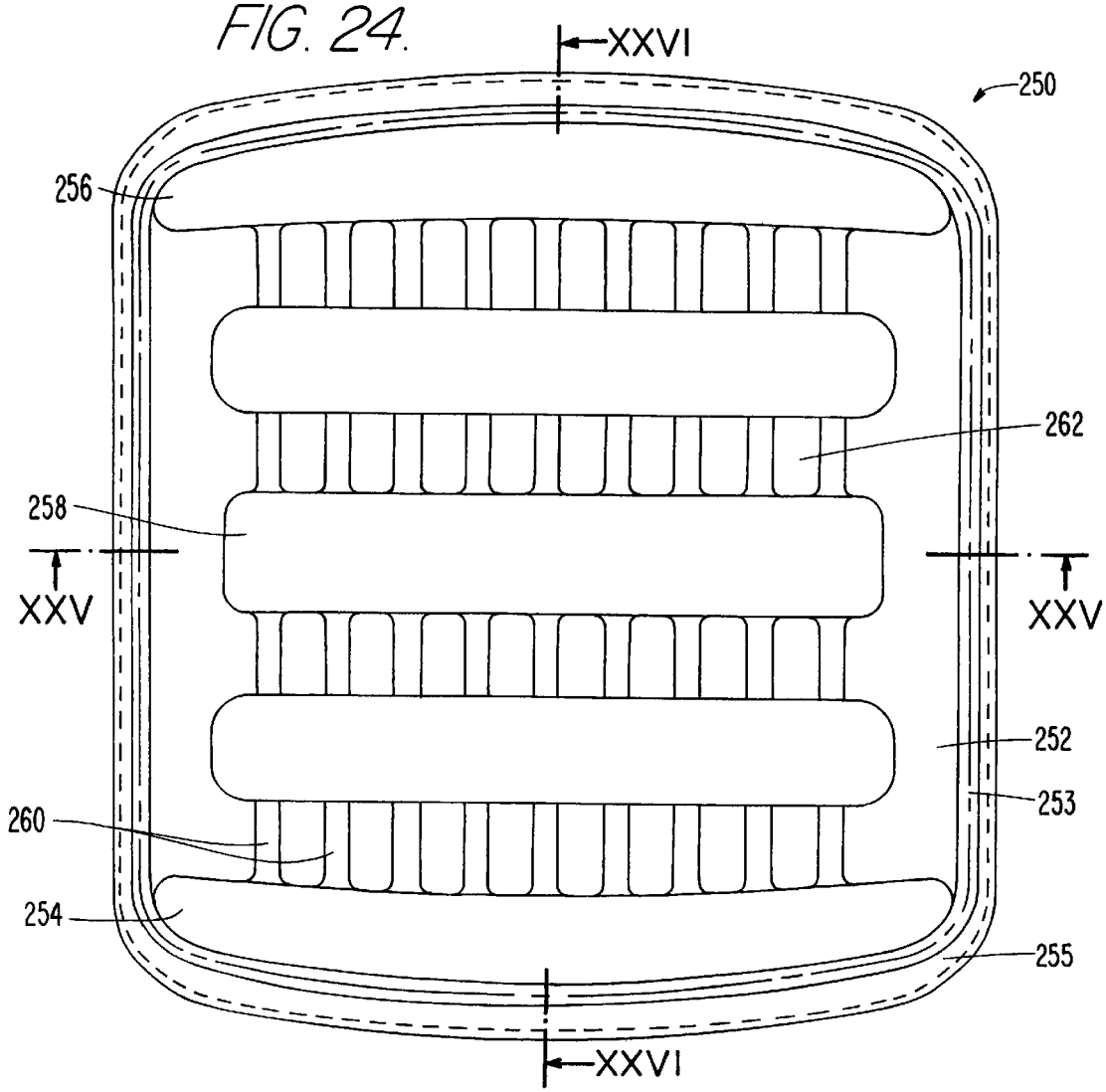
FIG. 24 is a top plan view of a lower pan portion of another multiple-part baking pan kit.
Figure 25:
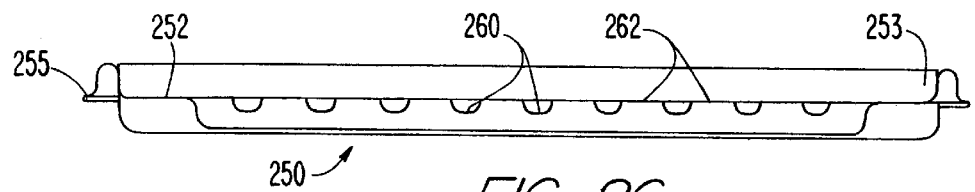
FIG. 25 is a cross-sectional view taken along line XXV—XXV in FIG. 24.
Figure 26:
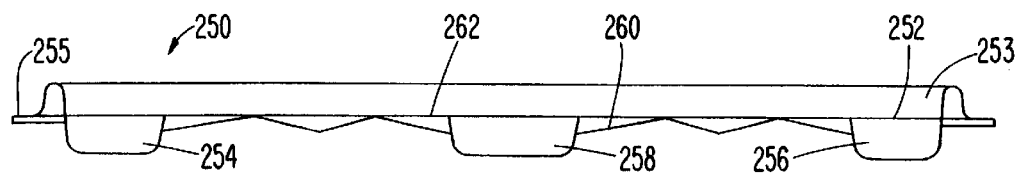
FIG. 26 is a cross-sectional view taken along line XXVI—XXVI in FIG. 24.

As illustrated in FIGS. 24–26, a lower pan portion 250 of another multiple-part baking pan kit essentially similar to that of FIGS. 13–23 includes a main plate 252 surrounded by a folded-over perimetric wall 253 (with a flange 255) and provided with three elongate spaced recesses or channels 254, 256 and 258. Recesses 254 and 256 are provided along opposite sides of plate 252, along edges or ends thereof, and define water-receiving reservoirs for purposes of steam generation as discussed above. The location of recesses 254 and 256 along edges or ends of plate 252 enhances heat collection and accordingly steam generation particularly in gas ovens where heated air rises along the side walls of the oven enclosure. Recesses of channels 254 and 256 are deep to provide increased surface area for heat transfer, thereby accelerating the generation of steam at the beginning of a cooking procedure.

A plurality of inclined grooves 260 extending in parallel to one another are provided in plate 252 along the edges of recesses 254 and 256. Grooves 260 are lowered regions which are interleaved or interdigitated with raised land areas 262. Preferably, at least some of the land areas 262 are in effective heat-transmitting contact with a lower surface of an upper baking pan portion or docking pan 264 (FIGS. 27–29) when the upper pan portion is assembled with lower pan portion 250. The resultant increase in area of contact increases the rate that heat is transferred from lower pan portion 250 to upper pan portion 264. Grooves 260 define a plurality of channels for conducting steam from recesses 254 and 256 to openings 266 and 268 in upper pan portion 264 (see FIGS. 27–29).

Recesses 254, 256 and 258 extend parallel to one another and are laterally staggered relative to openings 266 and 268 when upper pan portion 264 is attached to lower pan portion 252. Recess 258 may receive a flavoring composition as discussed above.

As shown in FIGS. 27–29, upper pan portion 264 comprises a plate 270 in which openings 266 and 268 are disposed. Plate 270 is provided with upstanding flanges 272 and 274 extending around openings 266 and 268 and is further provided with an upstanding perimetric flange 276 to which an outwardly extending flange or shelf 278 is connected.

In a modified baking procedure utilizing a multiple-part kit as described hereinabove with reference to FIGS. 13–23 or 24–29, water may be placed on upper pan portion 132 or 264 prior to a placement of the assembled baking pan and the subject food product into an oven enclosure or even after the placement of the pan and foodstuff into the oven. This procedure results in an increase in the moisture level or humidity inside the oven and serves to moisten and prevent burning of upper surface of a food product. This procedure also serve to prevent burning of a lower surface of a food item, since the water in the upper pan portion 132 or 264 functions as a heat sink to reduce the temperature of the upper pan portion as long as water remains on the upper pan portion.

Where a baking pan part or panel 190, 192, or 194 is placed atop upper baking pan portion or docking pan 132, it is possible for that pan part or panel to be formed with recesses or receptacles for containing water to permit the introduction of moisture or steam directly into a oven chamber. Such recesses or receptacles are preferably aligned with and partially insertable into respective water-receiving recesses 254 and 256 of lower pan portion 250 or recesses 144 and 148 of pan portion 132.

In an alternative cooking procedure, a pan part or panel 190, 192, or 194 may be used by itself, without a lower pan portion and without a upper pan portion. In that case, the introduction of water into reservoirs formed in the pan part or panel 190, 192, 194 serves in part to provide a heat sink which reduces the temperature of the respective pan part as long as water is present in the respective reservoir. This capability helps to prevent burning of a lower surface of a food item such as pizza crust or a cookie disposed on the pan part during a cooking procedure.

In a two-component baking pan as described herein, an upper pan portion may similarly be provided with water-receiving recesses which are alignable with respective recesses in the lower pan portion. Water may be placed in the recesses or reservoirs of the lower pan portion only, in the recesses or reservoirs of the upper pan portion only, in the recesses or reservoirs of both the lower pan portion and the upper pan portion, or in none of the recesses or reservoirs, depending on the food product being cooked and the result desired.

FIGS. 30–32 illustrate a food pan part or panel 280 which is connectable to upper pan portion or docking pan 264 over an opening 266 or 268. Generally, openings 266 and 268, as well as their upstanding flanges 272 and 274, are of identical dimensions so that food pan part 280 may be connected to upper pan portion 264 over either opening 266 or 268. Food pan part 280 is designed particularly for the baking of an elongate piece of dough into bread. However, pan part 280 may find other uses, depending on the inclinations and imagination of the user.

An upper surface of pan part 280 is formed with a elongate concavity 282 in turn formed with a depression 284 in the shape of a fishbone. Depression 284 has a backbone portion 286 and ribs 288 extending outwardly therefrom. Perforations 290 are provided in pan part 280 in and around fishbone-shaped depression 284. At the beginning of a baking operation, a piece of dough placed on pan part 280 settles into depression 284. This seating of the dough anchors the dough to the pan and inhibits shifting of the dough on the baking pan during transfer of the pan into an oven. During the baking of the piece of dough into a loaf of bread, the bottom surface of the dough eventually tightens and separates or rises from the bottom of depression 284 so that at least one space is formed between pan part 280 and the dough in the region of depression 284. This space permits steam to escape from beneath the cooking dough, for example, via ribs 288. Towards the end of the baking process, this escape of remaining steam facilitates a hardening of the lower surface of the cooking dough to form crust.

Pan part 280 is optionally formed at opposite ends with a pair of handles 292 and 294. A downwardly extending skirt 296 is dimensioned to fit closely about flanges 272 and 274 of upper pan portion 264. Preferably, skirt 296 is in substantial contact with the respective flange 272 or 274 to ensure optimal heat transfer from upper pan portion 264 to pan part 280 and to the food product disposed thereon during a baking process.

FIGS. 33–35 depict another pan part or panel 300 adapted for the cooking of egg rolls and similar food items. An upper surface 302 of pan part 300 is provided in a recessed central area 303 with two arrays 304 and 306 of criss-crossing grooves 308 and 310. Also distributed throughout that central area are a multiplicity of perforations 312 and 314 in two arrays (not separately labeled) substantially coextensive with criss-crossing groove arrays 304 and 306. As discussed hereinabove with reference to fishbone-shaped depression 284, grooves 308 and 310 facilitate the dispersion of excess steam towards the end of a steaming cycle, to facilitate the formation of crust at a lower surface of a foodstuff such as an eggroll placed on pan part 300 over array 304 or 306.

Pan part 300 is optionally provided at opposite ends with a pair of handles 316 and 318 and a downwardly extending skirt 320 is dimensioned to fit closely about flanges 272 and 274 of upper pan portion 264. Again, it is advantageous if skirt 320 is in substantial contact with the respective flange 272 or 274. This provides for optimal heat transfer from upper pan portion 264 to pan part 300 and to the food product disposed thereon during a baking process.

Other pan parts for cooperating with upper pan part or docking pan 264 to generate baking pans of different utilities are substantially similar to those described above with reference to FIGS. 3–23. Thus, the pan parts connectable to upper pan part 264 additionally include pan parts similar to parts 158, 160, 162, 164, 190, 192 and 194 in FIGS. 15–21. Perforations 172 in an upper surface or panel of pan part 160 are advantageously disposed in shallow circular or oval depressions (not shown) for purposes of facilitating steam blood-off towards the end of a steaming cycle and for anchoring or securing a food item such as a lump of muffin dough to the pan part 160 to prevent dislodgement during pre-cooking pan transfers.

As illustrated in FIG. 36, a generic pan part or food pan 322, which represents any pan part 158, 160, 162, 164, 190, 192 and 194 in FIGS. 15–21 and 280 and 300 in FIGS. 30–35, includes a major panel 324 to which a downwardly extending skirt or flange 326 is attached. Skirt 326 is formed to establish substantial heat-conductive contact with an upwardly extending flange 328 of a generic upper pan portion or docking pan 330. To further increase the area of contact between pan part of food pan 322 and upper pan portion 330, skirt 326 is formed along a free edge with an outwardly extending flange 332. Flange 332 engages upper pan portion 330 upon proper placement of pan part 322 on pan portion 330. Of course the close contact between skirt 326 and flange 328 and between flange 332 and upper pan portion 330 serves to form a steam tight seal. Outwardly extending flange 332 is preferably but optionally formed along a free edge with an upwardly turned lip 334 which is curled to hide sharp edges and thus prevent nicks or cuts to users' hands.

As illustrated in FIG. 37, a cookie pan 336 comprises a main panel 338 provided with an upstanding perimetric flange or wall 340 and an outwardly extending flange or shelf 342. A pair of elongate recesses 344 and 346 are provided along opposite sides of panel 338 and are separated from panel 338 by respective elongate beads or rises 348 and 350.

Cookie pan 336 may be used by itself in the preparation of baked goods such as cookies. When filled with water, recesses 344 and 346 serve a dual function, namely, to humidify an oven into which the cookie pan is placed during a baking procedure and to limit the temperature of the pan during at least an initial phase of the baking procedure. Recesses 344 and 346 thus enable the provision of a heat sink for temperature control. This temperature control prevents burning of lower surfaces of cookies or other food items.

As illustrated in FIG. 38, cookie pan 336 may be used as a upper pan portion of a baking pan assembly including a lower pan portion 352. Lower pan portion 352 is provided with a pair of water-receiving recesses 354 and 356 along opposite edges of the lower pan portion. Upon attachment of cookie pan 336 to lower pan portion 352, recesses 344 and 346 are aligned with respective recesses 354 and 356. Water may be disposed in recesses 344 and 346, on the one hand, and/or recesses 354 and 356.

FIGS. 39 and 40 depict a baking pan 358 suitable for cooking egg rolls, breakfast rolls and other similar food items. Pan 358 has a main panel 360 provided with a plurality of elongate depressions 362 arranged in a rectangular array and further provided with a multiplicity of perforations 364 disposed in depressions 362. A pair of recesses or cavities 366 and 368 are provided along opposite sides or edges of main panel 360 and separated therefrom by respective beads 370 and 372. An upright perimetric wall 374 is formed with an outwardly extending flange 376. Baking pan 358 may be used by itself or with a lower baking pan portion, as described above with reference to FIGS. 37 and 38.

A baking pan or upper pan portion designed for the cooking or reheating of pizza pies may be provided with water-receiving reservoirs to act as humidifiers and/or heat sinks. In addition, the main panel of such a pan is preferably provided with shallow depressions for preventing slippage during transfer operations and for facilitating steam release at the end of a steaming stage of a cooking process.

Figure 43:
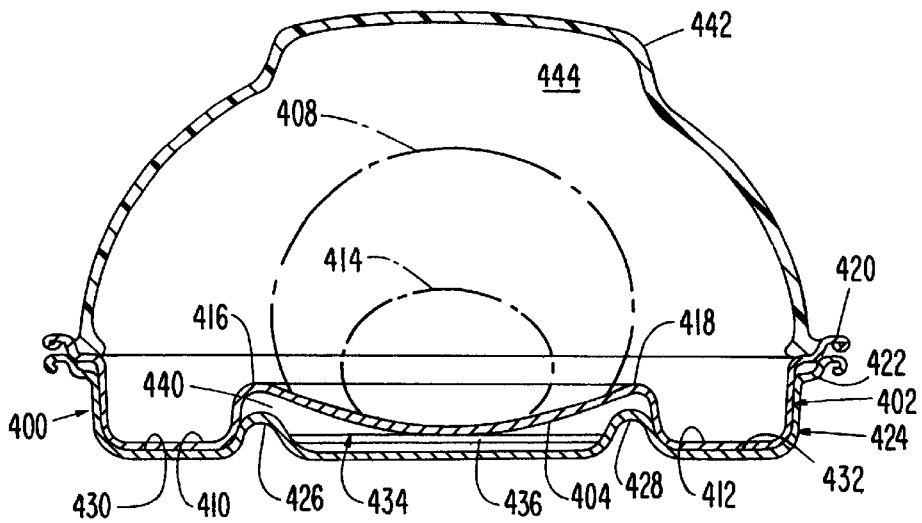
FIG. 43 is a schematic transverse cross-sectional view of the upper pan part of FIG. 41 and the lower pan part of FIG. 42, showing the two pan parts connected to one another and further showing a lid or cover disposed on the upper pan part.
Figure 41:
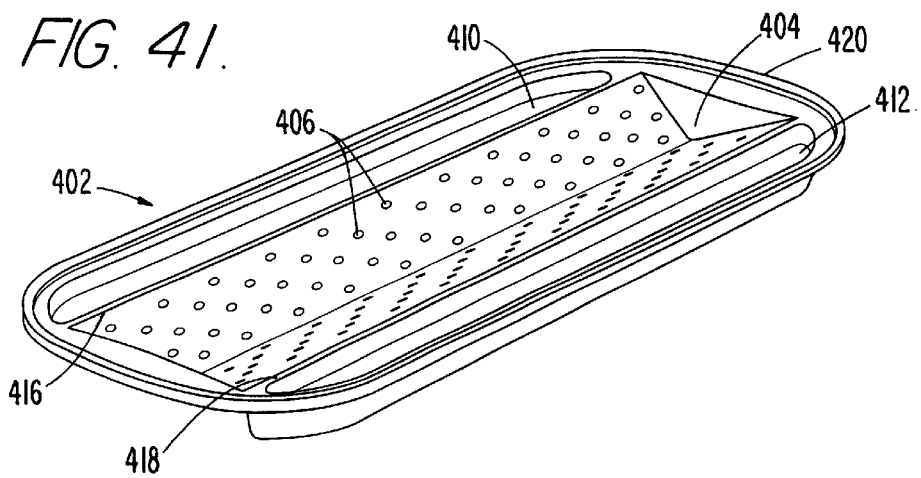
FIG. 41 is a perspective view of an upper pan part of a baking pan in accordance with the present invention.

As illustrated in FIGS. 41 and 43, an upper pan part 402 of a baking pan 400 is formed with an elongate depression or concavity 404 provided with a multiplicity of perforations 406 disposed in an elongate array generally conforming to a shape of a loaf of bread 408. Upper pan part 402 is further formed with a pair of elongate recesses 410 and 412 flanking depression 404 on opposite sides thereof Recesses 410 and 412 are separated from depression 404 by upraised edge sections 416 and 418 thereof. A dough piece 414 placed on depression 404 is thus isolated from liquid water placed in recesses 410 and 412 prior to a proofing process and/or a baking process. The water evaporates during the proofing process to moisten an upper surface of a piece of dough 414 placed on depression 404. During a baking process and more particularly during a steaming cycle or phase of a combined steaming and baking process, a portion of the water deposited in recesses 410 and 412 evaporates as water vapor prior to the boiling of the water and a remaining portion, the major portion, is converted into steam at the boiling temperature of 100° C. The terms "water vapor" and "steam" are used interchangeably herein. The term "steam" more particularly denotes water vapor or gaseous $H_2O$ formed at a liquid temperature of 100° C.

Upper pan part 402 includes a continuous or endless peripheral lip 420. As illustrated in FIG. 43, peripheral lip 420 is positioned over and in substantial, heat-transmitting contact with a peripheral lip 422 of a lower pan part 424 shown in FIGS. 42 and 43. Lower pan part 424 is formed with a pair of elongate raised areas or ridges 426 and 428 separating a pair of elongate longitudinally extending recesses 430 and 432 in lower pan part 424 from a central steam generating region 434. Region 434 of lower pan part 424 is formed with a multiplicity of transversely oriented raised areas or ridges 436 which define a plurality of water-receiving recesses 438. Ridges 436 define a level to which recesses 438 may be filled with water prior to a proofing process and/or a baking process. Although water may be introduced to a level above the height of transverse ridges 436, owing to the greater height of longitudinal ridges 426 and 428, it is recommended that the water extend no higher than ridges 436.

A substantial area of upper pan 402 is positioned in effective heat transmitting contact with lower pan part 424 when the two pan parts are connected to one another to form baking type pan 400, as shown in FIG. 43. "Effective heat contact" and similar phraseology as used herein means that there is an operative heat transfer from lower pan part 424 to upper pan part 402 by convection and/or conduction. Preferably, at least raised areas or ridges 426, 428 and 436 of lower pan part are spaced from upper pan part 402 by a distance of less than approximately 5 mm. More preferably, at least raised areas 426, 428 and 436 are spaced from upper pan part 402 by a distance of less than approximately 2.5 mm. Most preferably, at least raised areas 426, 428 and 436 are spaced from upper pan part 402 by a distance of less than approximately 1 mm. Other areas of upper pan part 402, including peripheral lip 420 and recesses 410 and 412, are also in effective heat transmitting contact with lower pan part 424. More specifically, peripheral lip 420 is in effective heat transmitting contact with peripheral lip 422 of lower pan part 424, while recesses 410 and 412 are in effective heat transmitting contact with recesses 430 and 432. Preferably, upper pan part 402 and lower pan part 424 are in effective heat transmitting contact with one another over an area which is at least 20% of the total area of the upper pan. More preferably, pan parts 402 and 424 are in effective heat transmitting contact with one another over an area which is at least 40% of the total area of upper pan part 402. Most preferably, pan parts 402 and 424 are in effective heat transmitting contact with one another over an area which is at least 70% of the total area of upper pan part 402.

As illustrated in FIG. 43, upper pan part 402 and lower pan part 424 cooperate with one another, in an assembled configuration of the pan parts, to define an internal chamber 440 which communicates on a lower side with recesses 438 and on an upper side with perforations 406. As discussed above with reference to other embodiments of a baking pan, water is placed in recesses 438 prior to a baking process. As will be gleaned from descriptions hereinabove, the term "baking process" as used herein generally refers to a combined steaming and baking procedure which includes a first phase of both steaming and baking and a second phase of baking only. During the steaming phase of the baking process, water in recesses 438 is converted to steam and directed through perforations 406 to a lower surface of dough piece 414. It is contemplated in a method of using the baking pan of FIGS. 41–43, as well as other baking pans described above, that dough piece 414 may initially cover only some of the perforations 406 in upper pan 402. During an initial part of a baking process, particularly before the water in recesses 438 is heated to the boiling point, the water vapor escapes from internal chamber 440 through those perforations 406 which are uncovered by dough piece 414. The escaping water vapor serves to humidify an oven or other heated enclosure (not shown) into which baking pan 400 is placed with dough piece 414. Dough piece 414 expands gradually to cover more and more of the perforations 406. Once a particular perforation is covered by the expanding dough, water vapor or steam from internal chamber 440 is directed through that perforation to a lower surface of the dough, with consequences and benefits as described above. The dough piece 414 preferably covers at least 60% of the perforations 406 by the end of the steaming phase of the baking process. More preferably, the dough 414 covers at least 80% of the perforations 406 by the end of the first, steaming, phase of the baking process. Most preferably, the dough covers 100% of the perforations by the end of the first phase of the baking process.

It is also possible, in a modification of this cooking procedure, to utilize a baking pan with one or more perforations none of which are covered at the onset of a baking process. Upon dough expansion during an initial phase of the baking process, one or more of the perforations become covered by the dough, enabling application of steam to a lower surface of the dough. In such a modified cooking procedure, the utilized pan may be provided with a circular or annular array of perforations, with a piece of dough being placed in the center of the perforation array. It is to be noted in this regard that an upper surface or upper panel of a baking pan may be formed with an array of nonhomogeneously or nonuniformly distributed perforations. For instance, an array of perforations may include one or more perforations in a central zone spaced from a peripheral zone having a plurality of distributed perforations. In this embodiment of a baking pan, there is a continuous or endless zone devoid of perforations.

As illustrated in FIG. 43, baking pan 400 may be provided with a perforated or unperforated lid or cover 442 which is positioned on upper pan part 402 to form a chamber 444 which concentrates the escaping water vapor. It is generally contemplated that lid or cover 442 is placed on upper pan part 402 after the placing of dough piece 414 thereon and prior to the first, steaming, phase of the combined steaming and baking process. Lid or cover 442 may be removed from upper pan part 402 at any time during or after the combined steaming and baking process. For example, lid 442 may be left in place on upper pan part during the entire baking operation. Alternatively, lid 442 may be removed from upper pan part 402 after the termination of the steaming phase, i.e., after all of the water in the baking pan 400 has been converted to water vapor or steam, but prior to removal of the baking pan and the dough or bread item from the oven. The lid may even be removed prior to the termination of the steaming phase or cycle.

Lid or cover 442 is preferably designed to closely match the outer surface of a food item. More specifically, lid 442 has an inner surface which is geometrically substantially congruent to and closely spaced from an outer surface of the food item during a baking process in a heated enclosure. This structure provides for an even browning of the outer surface of the food item during the baking process. In the case of bread, the lid is dome shaped and substantially deeper than the pan, whereas in the case of pizza, the lid is shallow and substantially flat.

It is to be noted that in addition to recesses 438, water may be placed in recesses 410 and 412, generally prior to the beginning of a baking operation. Although water may be added after baking has commenced, this procedure is generally not recommended insofar as various baking parameters such as temperature and moisture level will be more difficult to control. The water placed in recesses 410 and 412 eventually turns to steam and wets the upper surface of dough piece 414 during a steaming phase of a baking process.

Where there are more than one recess or reservoir furnished with water at the onset of a baking process, water in one recess, e.g., recess 410 and/or 412, may be measured so as to become depleted prior to the water in another recess, e.g., recesses 438. Thus, the application of moisture to upper surfaces of dough piece 414 will terminate prior to the wetting of the lower surface of dough piece 414 with steam via perforations 406.

Baking pan 400 may be also used in a proofing process executed prior to the combined steaming and baking process as described hereinabove. A usually predetermined or preset amount of water is deposited in recesses or reservoirs 410, 412 and/or recesses 438, while at least one piece of a dough 414 containing a leavening agent is placed on an upper surface of upper pan part 402. Generally, it is considered easier to deposit the water and the dough on the baking pan 400 prior to the insertion of the pan into an oven or other heated enclosure. However, it is also possible in some cases to place the dough and/or the water in or on the pan 400 after the pan has been placed in an oven, although this procedure is more preferably performed in the baking process rather than the proofing process. In another procedure, the lower pan part 424 is placed in the oven with the water, the lower pan part and the water being preheated prior to placement of the upper pan part 402 and the dough 414 (and optionally lid or cover 442) atop the lower pan part. In any event, after disposing of the pan, the dough, and the water in an oven, the oven is turned on for a limited period to heat the oven to a proofing temperature. Generally, the temperature selected in activating the oven is irrelevant since the oven is turned off before the temperature in the oven can attain the lowest temperature setting of a conventional oven's thermostat. The oven is turned off after a brief period of, for example, between one minute and one minute and thirty seconds, sufficient to heat the oven to a proofing temperature of between approximately 80° F. and approximately 110° F. More preferably, the proofing temperature is between approximately 90° F. and approximately 100° F. It is preferable that lid or cover 442 is disposed on upper pan part 402 during the proofing process. In that case, chamber 444 serves as a proofing chamber. Pan 400 is maintained with dough piece 414, the deposited water and lid 442 in the heated oven for a predetermined proofing interval, preferably between thirty minutes and an hour, during which water vapor from recesses 438 and optionally recesses 410 and 412 passes via respective uncovered perforations 406, 516 and 518 into chamber 444 to moisten an upper surface of dough piece 414 and to facilitate a rising of the dough. Baking pan 400 and the water received in recesses 438, and optionally recesses 410 and 412, function in part as heat sinks which initially absorb heat and subsequently release heat to maintain the proofing chamber (either chamber 444 or the oven space) at a temperature adequate for proofing of the dough.

Other baking pans disclosed hereinabove may be used, preferably with lids or covers, to implement such a proofing process. The proofing process may lead directly to a baking process, that is, without removing the dough or the baking pan from the oven. Lid or cover 442 is optionally retained in position on the upper pan part 402 and over dough piece 414 during all or part of the steaming and baking cycles, as discussed above. More specifically, after a sufficient proofing interval has elapsed, the oven is turned on to heat the oven enclosure or chamber to at least one baking temperature. During a first portion of a baking process commencing upon heating of the oven to the baking temperature, the water in recesses 438 is converted to steam at least a part of which is fed to a lower surface of the risen dough via perforations 406. Some of the steam may escape, either through uncovered perforations 406 or from beneath the dough, to moisten lateral and upper surfaces of the dough. Lid or cover 422, whether unitary or perforated, serves to retain the moisture in chamber 444, i.e., to resist or impede dispersion of the moisture throughout the oven enclosure. Lid or cover 442 serves also to lower the temperature in chamber 444. The increased moisture and (temporarily) lowered temperature inside chamber 444 delays drying of the upper surfaces of dough piece 414 during proofing and also delays the crust development of upper surfaces of dough piece 414 during baking. Chamber 444 serves as a cooking chamber during the baking process. After all of the water is converted to steam, the risen dough subjected to only baking during a second portion or phase of the baking process.

Figure 42:
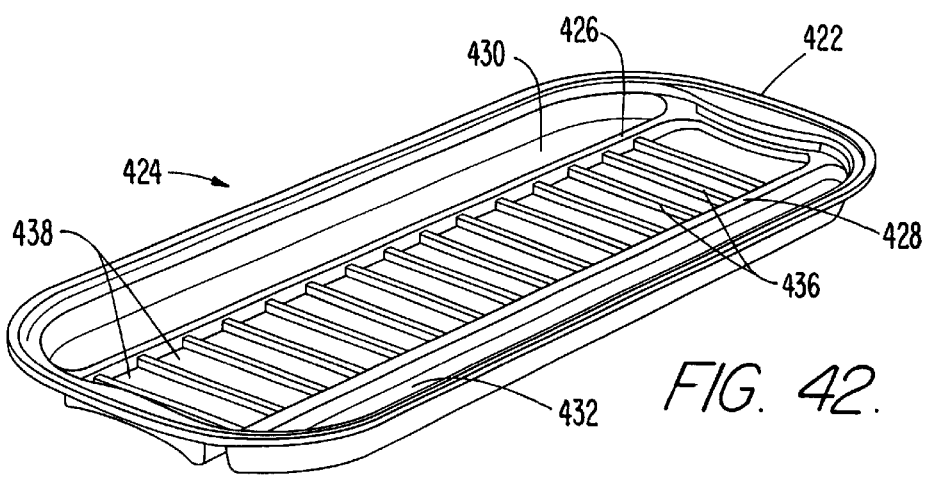
FIG. 42 is a perspective view of a lower pan part connectable to the upper pan part of FIG. 41 to form a baking pan in accordance with the present invention.

In an alternative proofing procedure discussed here with reference to FIGS. 41–43, hot water (e.g., near 100° C.) is placed in recesses 438 of lower pan part 424, as well as in recesses 410 and 412 thereof. Upper pan part 402 and dough 414 are positioned on lower pan part 424. This assembly is then provided with a proofing chamber at least partially surrounding the dough 414 and in communication with upper-pan perforations to allow humidification of the chamber by escaping water vapor. The proofing chamber may be formed by an oven, cover or lid 442, or a piece of foil formed extemporaneously to cover a desired portion of dough 414. In the case that the proofing chamber is formed by a preformed cover or lid 442 or one suitably shaped for the occasion, the proofing may be accomplished outside of an oven, for instance, on a kitchen counter or table top.

The humidification of the cooking chamber containing a dough product enables a dynamic equilibrium wherein moisture escaping from the dough and particularly from upper and lateral surfaces thereof is replaced by condensing moisture from the cooking chamber. Only after the water in the baking pan has been converted totally to steam does this equilibrium deteriorate and enable a hardening and a browning of the outer surfaces of the dough.

Figure 44:
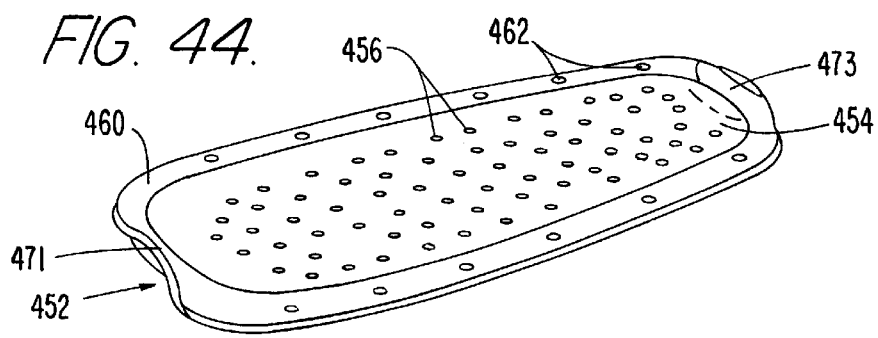
FIG. 44 is a perspective view of an upper pan part of another baking pan in accordance with the present invention.
Figure 45:
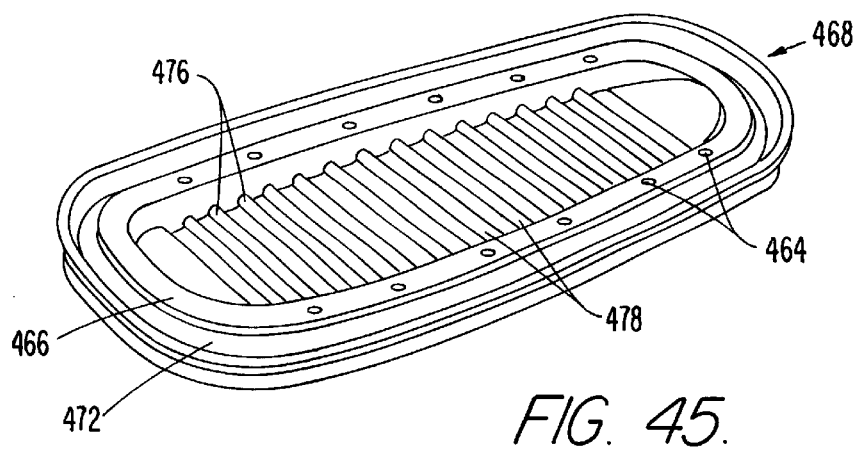
FIG. 45 is a perspective view of a lower pan part connectable to the upper pan part of FIG. 44 to form a baking pan in accordance with the present invention.
Figure 46:
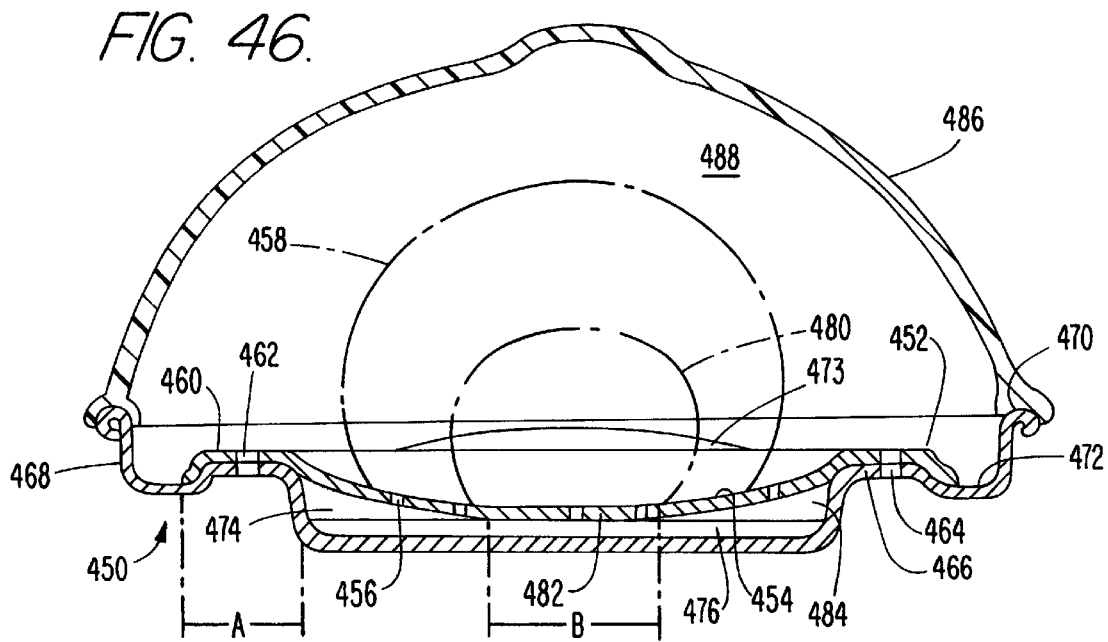
FIG. 46 is a schematic transverse cross-sectional view of the upper pan part of FIG. 44 and the lower pan part of FIG. 45, showing the two pan parts connected to one another and further showing a lid or cover disposed on the upper pan part.

As depicted in FIGS. 44 and 46, a baking pan 450 includes an upper pan part 452 formed with an elongate depression or concavity 454 provided with a multiplicity of generally evenly distributed perforations 456 disposed in an elongate array generally conforming to a shape of a loaf of bread 458. Upper pan part 452 is further formed with an endless or continuous raised periphery 460 flanking depression 454 on opposite sides thereof. Periphery 460 is provided with a plurality of spaced openings 462 which are aligned with respective openings 464 (FIGS. 45 and 46) in a continuous or endless raised area 466 of a lower pan part 468, when the lower pan part is connected to upper pan part 452 to form assembled pan 450. Raised area 466 is spaced from a periphery or lip 470 of lower pan part 468. Thus, upper pan part 452 is smaller than lower pan part 468 and rests generally on raised area 466 of the lower pan part in the assembled configuration of pan 450 as illustrated in FIG. 46. Upper pan part 452 is provided along periphery 460 with a pair of opposed upturned lips 471 and 473 serving as handles.

Raised area or ridge 466 and periphery or lip 470 of lower pan part 468 are connected to one another by a section defining a continuous or endless recess 472. Also, raised area or ridge 466 surrounds a steam generating region 474 including a multiplicity of elongate raised areas or ridges 476 extending parallel to each other and generally transversely to a longitudinal axis (not shown) of lower pan part 468. Ridges 476 define a plurality of elongate parallel water-receiving recesses 478.

Raised periphery 460 of upper pan part 452 isolates a dough piece 480 on depression 454 from liquid water which is optionally deposited in endless or perimetral recess 472 at the beginning of a proofing process or prior to a baking process. This water evaporates during the proofing process to moisten an upper surface of dough piece 480. During a baking process and more particularly during a steaming cycle or phase of a combined steaming and baking process, a relatively small portion of the water deposited in recess 472 evaporates and a relative large portion is converted into steam for wetting the upper surfaces of dough piece 480.

Periphery or lip 460 and a central portion 482 of depression 454 of upper pan part 452 are positioned over and in substantial or effective heat-transmitting contact with respective portions of lower pan part 468. As discussed above, "effective heat contact" means that there is an operative heat transfer from lower pan part 468 to upper pan part 452 by convection and/or conduction. Preferably, periphery or lip 460 and central portion 482 of depression 454 of upper pan part 452 are spaced from lower pan part 468 by a distance of less than approximately 5 mm. More preferably, periphery or lip 460 and central portion 482 of depression 454 are spaced from lower pan part 468 by a distance of less than approximately 2.5 mm. Most preferably, periphery or lip 460 and central portion 482 of depression 454 are spaced from lower pan part 468 by a distance of less than approximately 1 mm. Preferably, upper pan part 452 and lower pan part 468 are in effective heat transmitting contact with one another over a combined area of two times area A plus area B which is at least 20% of the total area of upper pan part 452. More preferably, pan parts 452 and 468 are in effective heat transmitting contact with one another over a total area of two times area A plus area B which is at least 40% of the total area of upper pan part 452. Most preferably, pan parts 452 and 468 are in effective heat transmitting contact with one another over a total area of two times area A plus area B which is at least 70% of the total area of upper pan part 452.

Upper pan part 452 and lower pan part 468 cooperate with one another, in an assembled configuration of the pan parts (FIG. 46), to define an internal chamber 484 which communicates on a lower side with recesses 478 and on an upper side with perforations 456. Water is placed in recesses 478 prior to a baking process (combined steaming and baking procedure). During a steaming phase of the baking process, water in recesses 478 is converted to steam and directed through perforations 456 to a lower surface of dough piece 480. Dough piece 480 might initially cover only some of the perforations 456 in upper pan 452. During an initial part of a baking process, particularly before the water in recesses 478 is heated to the boiling point, the water vapor escapes from internal chamber 484 through those perforations 456 which are uncovered by dough piece 480. The escaping water vapor serves to humidify an oven or other heated enclosure (not shown) into which baking pan 450 is placed with dough piece 480. If a lid or cover 486 is placed on periphery or lip 470 of lower pan part 468 to form a dough-containing chamber 488, the water vapor escaping from internal chamber 484 increases the humidity in chamber 488 and thereby lowers the temperature of the air in direct contact with the upper surfaces of dough piece 480 and simultaneously moistening those upper surfaces to prevent a premature hardening of those surfaces. This moistening or humidification process enables the production of a larger and fluffier loaf of bread for reasons discussed hereinabove.

Dough piece 480 expands gradually to cover more and more of the perforations 456. Once a particular perforation 456 is covered by the expanding dough, water vapor or steam from internal chamber 484 is directed through that perforation to a lower surface of the dough, with consequences and benefits as described above. The expanded dough 480 preferably covers at least 60% of the perforations 456 by the end of the steaming phase of the baking process. More preferably, the dough 480 covers at least 80% of the perforations 456 by the end of the first, steaming, phase of the baking process. Most preferably, the dough covers 100% of the perforations 456 by the end of the first phase of the baking process.

As discussed above with reference to FIGS. 41–43, depression 454 may be provided with an irregular or non-homogeneous array of perforations 456 which makes it possible for dough piece 480 to cover none of the perforations 456 at the beginning of a steaming phase of a baking process. The dough 480 expands to eventually cover some or all of the perforations 456, with attendant steam application to the lower surface of the dough.

It is generally contemplated that lid or cover 486 is placed on periphery or lip 470 of lower pan part 468 after the placing of dough piece 480 thereon and prior to the first, steaming, phase of the baking (steaming and baking) process. Lid 486 may be removed from lower pan part 468 at any time during or after the baking process. For example, lid 486 may be left in place over upper pan part 452 during the entire steaming and baking operation. Alternatively, lid 486 may be removed from baking pan 450 immediately upon the termination of the steaming phase, i.e., just after all of the water in the baking pan has been converted to water vapor or steam, but prior to removal of the baking pan and the dough or bread item from the oven. The lid 486 may even be removed from pan 450 prior to the termination of the steaming phase or cycle.

It is to be noted that in addition to recesses 478, water may be placed in recess 472, generally prior to the beginning of a baking operation. The water placed in recess 472 eventually turns to steam and wets the upper surface of dough piece 480 during a steaming phase of a baking process.

Where there are more than one recess or reservoir furnished with water at the onset of a baking process, water in one recess, e.g., recess 472, may be measured so as to become depleted prior to the water in another recess, e.g., recesses 478. Thus, the application of moisture to upper surfaces of dough piece 480 will terminate prior to the wetting of the lower surface of dough piece 480 with steam via perforations 456.

As discussed above with reference to baking pan 400 of FIGS. 41–43, baking pan 450 may be also used in a proofing process executed prior to the combined steaming and baking process as described hereinabove. Where at least some of the perforations 456 are not covered by dough piece 480, a preset amount of water is deposited in recesses 478. Enough of this water evaporates and escapes through perforations 456 into chamber 488 during a proofing process to prevent upper and lateral surface of dough piece 480 from drying out. Additional water is optionally deposited into recess 472 prior to the proofing process. Preferably, the water and the dough are deposited on baking pan 450 prior to the insertion of the pan into an oven or other heated enclosure. It is also preferable that lid 486 is placed on periphery or lip 470 of lower pan part to create chamber 488 prior to the placement of the water, dough 480 and pan 450 into the oven. Thereafter, the oven is turned on for a limited period, for instance, between sixty and ninety seconds, to heat the oven to a proofing temperature of between 80° F. and 110° F. (preferably 90° F. to 100° F.). Pan 450 is maintained with dough piece 480, the deposited water and lid 486 in the heated oven for a predetermined proofing interval, preferably between thirty minutes and an hour, during which water vapor passes from the liquid water in recesses 478 and optionally recess 472 into chamber 488 to moisten an upper surface of dough piece 480 and to facilitate a rising of the dough.

During a subsequent baking process, which may follow directly after the proofing process, steaming and baking cycles occur as discussed above. During the baking process, heated air is circulated from a region below lower pan part 468 to chamber 488 through aligned openings 462 and 464. This facilitates the baking of dough 480 and the browning of the lateral and upper surfaces thereof, particularly after the depletion of water in recesses 478 and 472. It is to be noted that where water is placed in both recesses 478 and 472, the water in recess 472 (or recesses 478) may be depleted by design prior to the depletion of the water in recesses 478 (or recess 472). Consequently, the lower surfaces (or upper surfaces) of dough piece 480 may be wetted or moistened for a longer period that the upper surfaces (lower surfaces) of the dough piece.

Figure 47:
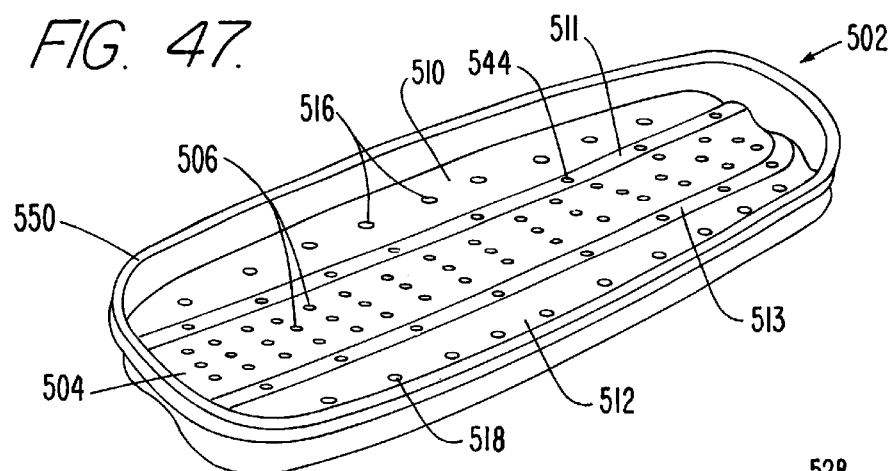
FIG. 47 is a perspective view of an upper pan part of a further baking pan in accordance with the present invention.
Figure 49:
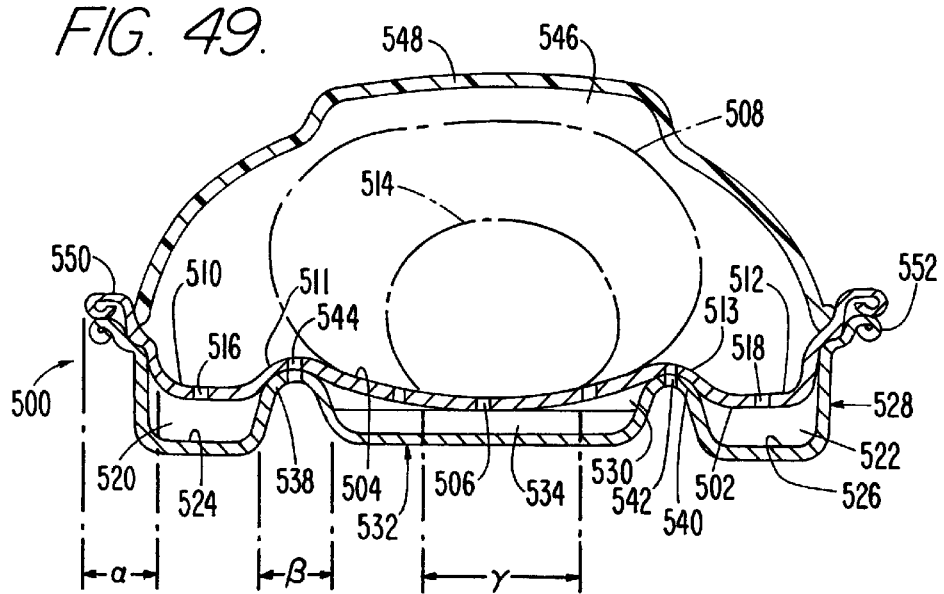
FIG. 49 is a schematic transverse cross-sectional view of the upper pan part of FIG. 47 and the lower pan part of FIG. 48, showing the two pan parts connected to one another and further showing a lid or cover disposed on the upper pan part.

As illustrated in FIGS. 47 and 49, an upper pan part 502 of a baking pan 500 is formed with an elongate depression or concavity 504 provided with a multiplicity of perforations 506 disposed in an elongate array generally conforming to a shape of a loaf of bread 508. Upper pan part 502 is further formed with a pair of elongate recesses 510 and 512 flanking depression 504 on opposite sides thereof. Recesses 510 and 512 are separated from depression 504 by raised edge sections 511 and 513 thereof. A dough piece 514 is placed on depression 504 and generally covers only some of the perforations 506 at the beginning of a baking process including steaming and baking operations as discussed above.

Figure 48:
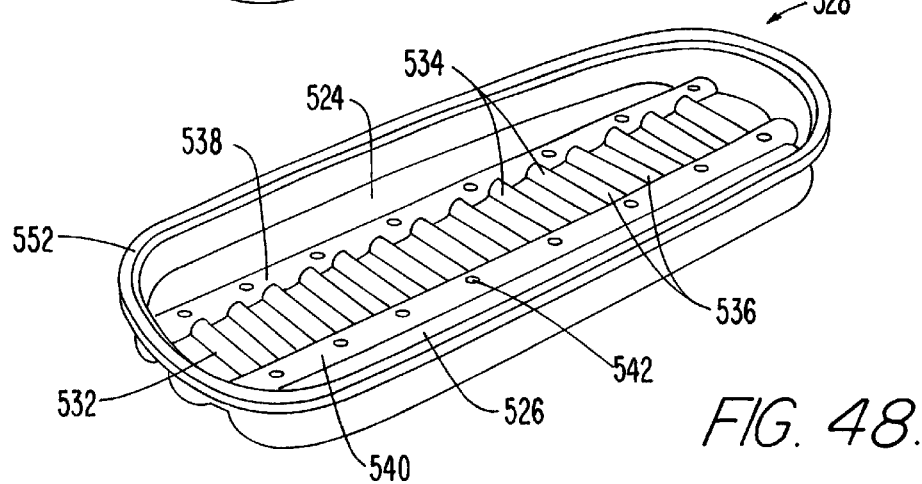
FIG. 48 is a perspective view of a lower pan part connectable to the upper pan part of FIG. 47 to form a baking pan in accordance with the present invention.

Recesses 510 and 512 are each provided with a respective plurality of spaced perforations 516 and 518. Perforations 516 and 518 communicate with respective internal chambers 520 and 522 defined between recesses 510 and 512 on an upper side and elongate recesses 524 and 526 formed along opposite sides of a lower pan part 528 (FIGS. 48 and 49). Perforations 506 in depression 504 communicate with another internal baking pan chamber 530 bounded on an upper side by depression 504 and on a lower side by a central section 532 of lower pan part 528. Central section 532 is formed with a plurality of elongate parallel ridges or raised areas 534 defining therebetween a plurality of elongate parallel recesses 536. Recesses 536 extend transversely relative to longitudinal recesses 524 and 526 and are spaced therefrom by a pair of elongate raised areas or ridges 538 and 540. Raised areas or ridges 538 and 540 are each provided with a plurality of spaced openings 542 which are aligned, in an assembled configuration of pan parts 502 and 528, with respective openings 544 provided in raised edge sections 511 and 513. Aligned openings 542 and 544 enable circulation of heated air from a region (not designated) below lower pan part 528, on the one hand, and a region above upper pan part 502. The latter, upper region in many cases is a dough-containing space or chamber 546 formed by placing a perforated or unperforated lid or cover 548 on upper pan part 502.

A substantial area of upper pan 502 is positioned in effective heat transmitting contact with lower pan part 528 when the two pan parts are connected to one another to form baking type pan 500, as shown in FIG. 49. Again, "effective heat contact" and similar phraseology as used herein means that there is an operative heat transfer from lower pan part 528 to upper pan part 502 by convection and/or conduction. In area a, a periphery or lip 550 of upper pan part 502 is in effective or substantial heat contact with a periphery or lip 552 of lower pan part 528. In area β, raised edge sections 516 and 518 of upper pan part 502 are in effective heat contact with raised areas or ridges 538 and 540 of lower pan part 528. In area γ, a central portion (not designated) of depression 504 is in effective heat contact with transverse raised areas or ridges 534 of lower pan. Generally, for effective heat contact, upper pan part 502 is spaced in areas α,β, and γ by less than 5 mm from lower pan part 504. More preferably, upper pan part 502 is spaced in areas α, β, and γ by less than 2.5 mm from lower pan part 504. Most preferably, upper pan part 502 is spaced in areas α, β, and γ by less than 1 mm from lower pan part 504. The combined area of two times area α, two times area β, and area γ is preferably at least 20%, more preferably at least 40%, and most preferably at least 70% of the total area of upper pan part 502.

As illustrated in FIG. 49, assembled upper pan part 502 and lower pan part 528 cooperate with one another to define central steam-generating internal chamber 530 which communicates on a lower side with transverse recesses 536 and on an upper side with perforations 506. Assembled upper pan part 502 and lower pan part 528 further cooperate with one another to define the lateral steam-generating internal chambers 520 and 522 which communicate on a lower side with recesses 524 and 526 and on an upper side with perforations 516 and 518. As discussed above with reference to other embodiments of a baking pan, water is placed in recesses 536 and optionally recesses 524 and 526 prior to a baking process. The water may be deposited prior to a proofing process which leads directly into a baking process as described above with reference to the embodiments of FIGS. 41–43 and FIGS. 44–46. During a steaming phase of the baking process, water in recesses 536 is converted to steam and directed through perforations 506 to a lower surface of dough piece 514. Dough piece 514 may initially cover only some of the perforations 506 and expands during the baking process to cover more of the perforations 506. Before the water in recesses 536 is heated to the boiling point, the water vapor escapes from internal chamber 530 through those perforations 506 which are uncovered by dough piece 514. The escaping water vapor serves to humidify an oven or other heated enclosure (not shown) into which baking pan 500 is placed with dough piece 514. Dough piece 514 expands gradually to cover more and more of the perforations 506. Once a particular perforation is covered by the expanding dough, water vapor or steam from internal chamber 530 is directed through that perforation to a lower surface of the dough, with consequences and benefits as described above. The dough 514 preferably covers at least 60% of the perforations 506 by the end of the steaming phase of the baking process. More preferably, the dough 514 covers at least 80% of the perforations 506 by the end of the first, steaming, phase of the baking process. Most preferably, the dough covers 100% of the perforations by the end of the first phase of the baking process.

During a baking process, the water placed in central steam-generating chamber 530 and particularly in recesses 536 may be depleted at a time different from the time of depletion of water placed in recesses 524 and 526. The durations of steam production in chamber 530 and 520, 522 are determined in part by the amounts of water placed in recesses 536 and 524, 526 and also by the relative heat-transmitting areas of the respective chambers. Generally, the ridge and recess structure of central section 532 of lower pan part 528 provides for a high rate of heat transfer to the water disposed in recesses 536. Thus, if it is desired to deplete the water in lateral recesses 524 and 526 prior to the water in recesses 536, the water in the lateral recesses must be less than the water in recesses 536.

It is generally contemplated that lid or cover 548 is placed on upper pan part 502 after the placing of dough piece 514 thereon and prior to a proofing process or at least prior to the first, steaming, phase of the combined steaming and baking process. Lid or cover 548 may be removed from upper pan part 502 at any time during or after the combined steaming and baking process. For example, lid 548 may be left in place on upper pan part during the entire baking operation. Alternatively, lid 548 may be removed from upper pan part 502 after the termination of the steaming phase, i.e., after all of the water in the baking pan 500 has been converted to water vapor or steam, but prior to removal of the baking pan and the dough or bread item from the oven. The lid may even be removed prior to the termination of the steaming phase or cycle.

In some cases, it may be necessary to add water only to recesses 536 and not to recesses 524 and 526. In that case, dough piece 514 may initially cover only some of the perforations 506 of depression 504. During an initial, proofing process, some water vapor escapes through the uncovered perforations 506 to increase the humidity in chamber 546. During the proofing process and the subsequent baking processes, the dough gradually expands to cover more and more of the perforations 506, and perhaps all of the perforations by the end of the steaming cycle.

Figure 51:
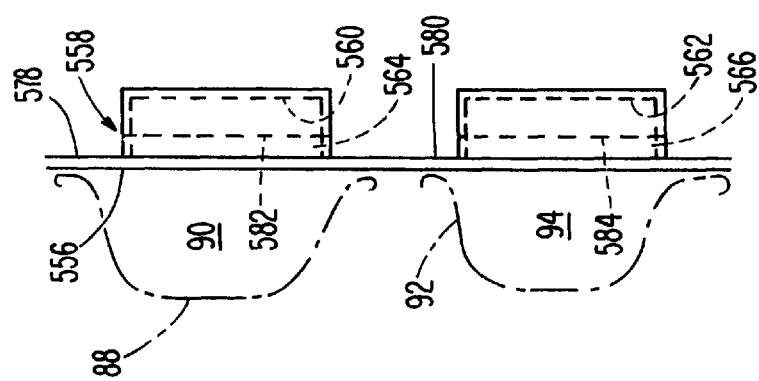
FIG. 51 is a schematic side elevational view of the two-part baking pan of FIG. 50.
Figure 50:
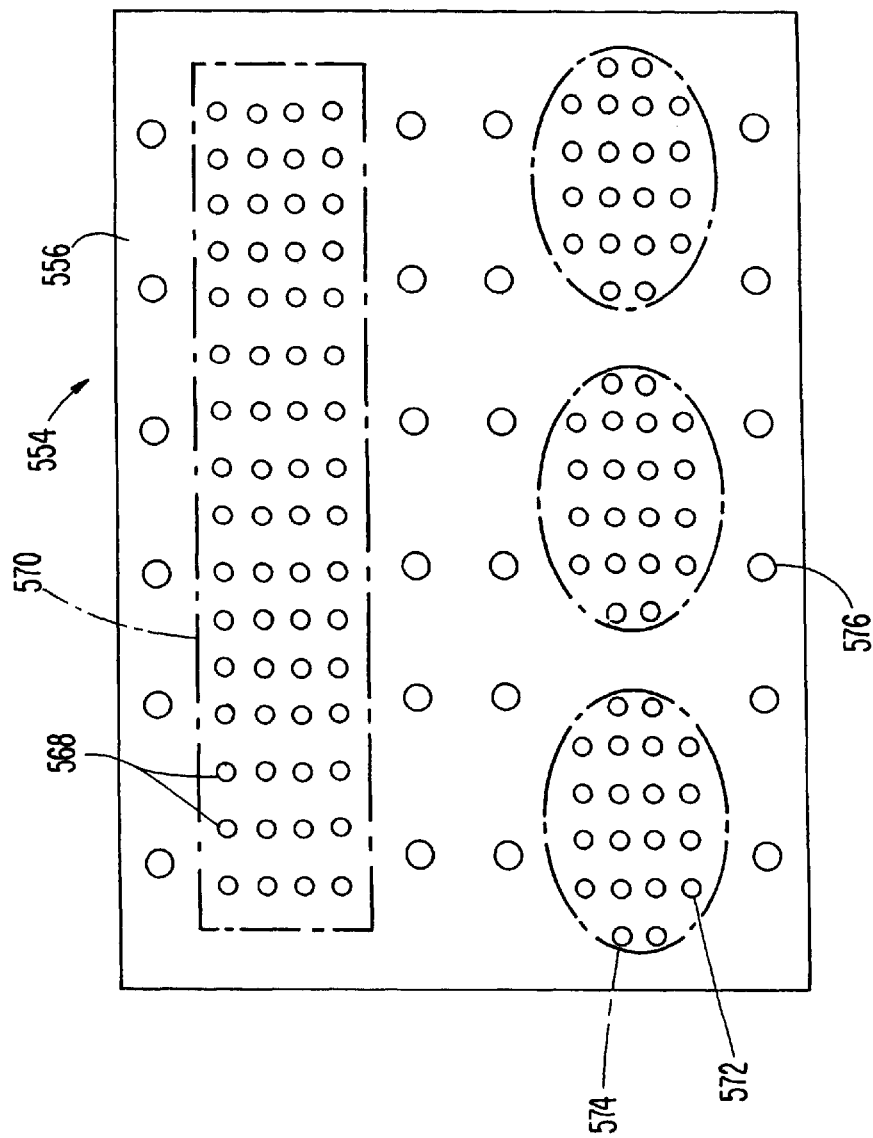
FIG. 50 is a schematic top view of another two-part baking pan in accordance with the present invention.

As shown in FIGS. 50 and 51, a baking pan 554 includes an upper pan part 556 and a lower pan part 558. Lower pan part 558 is provided with a pair of recesses 560 and 562 defining or associated with respective steam-generating internal chambers 564 and 566. Upper pan part 556 is provided with a first set of perforations 568 uniformly distributed in a first array 570 overlying internal chamber 564 and recess 560. Array 570 conforms generally to the size and shape of a food item to be cooked on upper pan part over perforations 568. Array 570 in this exemplary schematic embodiment corresponds to a loaf of bread. Upper pan part is further provided with a second set of perforations 572 uniformly distributed in a second array 574 overlying internal chamber 566 and recess 562. Array 574 conforms generally to the size and shape of a food item such as a biscuit or roll to be cooked on upper pan part over perforations 572. Three identical arrays 574 of perforations 572 are shown. Upper pan part 556 is also provided with openings or apertures 576 which are aligned with openings (not shown) formed in peripheral land areas 578 and a central land area 580 of lower pan part 558. The aligned openings 576 serve to facilitate air circulation during a convection type baking process.

In a cooking method utilizing the pan of FIGS. 50 and 51, a first amount of water 582 is deposited in recess 560 and a second amount of water 584 is deposited in recess 562. A first food item such as an elongate piece of dough (not shown) is disposed on upper pan part 556 over at least some of the first set of perforations 568, while a second food item such as a smaller piece of dough (not shown) is disposed on upper pan part 556 over at least some perforations 572. Baking pan 554, the two food items, the two amounts of water 582 and 584 are all placed in a heated enclosure, i.e. an oven (not shown). Thereafter, the water 582 and 584 is converted to steam. Steam from the first amount of water 582 is applied to a lower surface of the first food item via the first set of perforations 568, whereas the steam from the second amount of water 584 is applied to a lower surface of the second food item via the second set of perforations 572. One of the food items is removed from the oven after the conversion to steam of essentially all of the respective amount of water 582 or 584. The removal of the one food item may occur immediately upon exhaustion of the respective amount of water 582 or 584, or, alternatively, after some dry-heat baking (without steam). Of course, the one food item could be removed prior to the conversion of the respective amount of water to steam 582 or 584. However, generally, the amount of water 582 or 584 placed in the respective recess 560 or 562 is measured out so as to become depleted prior to time for removal of the food item. After removal of the one food item, the other food item is subjected to only baking (and optionally some steaming) in the heated enclosure. Thus, the water amounts 582 and 584 may be selected to provide respective steaming cycles of different durations. Steaming of one food item might continue after steaming of the other food article has terminated and perhaps even after removal of that other food article from the oven.

In a modification of the steaming and baking method utilizing the baking pan of FIGS. 50 and 51, a first perforated or unperforated lid 588 is positioned on upper pan part 556 over the first food item and the first set of perforations 568 to define a first proofing and/or cooking chamber 590 which contains the first food item and communicates with recess 560 via perforations 568. A second perforated or unperforated lid 592 is positioned on upper pan part 556 over the second food item and the second set of perforations 572 to define a second proofing and/or cooking chamber 594 containing the second food item and communicating with recess 562 via perforations 572. Lids 588 and 592 are placed in the oven together with baking pan 554, the first food item, the second food item, the first amount of water 582, and the second amount of water 584. Upon elapse of a period of time after placement of the lids in the heated enclosure together with the baking pan, the food items, and the water, one of the lids is removed from the heated enclosure together with the respective food item.

This steaming and baking method is further modified with the use of an altered baking pan 596 illustrated in FIGS. 52 and 53. Two separate upper pan parts 598 and 600 are disposed on a lower pan part 602 provided with a pair of recesses 604 and 606 defining or associated with respective steam-generating internal chambers 608 and 610. Upper pan part 598 is provided with a first set of perforations 612 uniformly distributed in a first array 614 which overlies internal chamber 608 and recess 604 in an assembled configuration of upper pan part 598 and lower pan part 602. Array 614 conforms generally to the size and shape of a food item such as a loaf of bread (not illustrated) to be cooked on upper pan part 598 over steam-generating internal chamber 608. Upper pan part 600 is provided with a three arrays 616 of uniformly distributed perforations 618. Perforation arrays 616 overlie internal chamber 610 and recess 606. Arrays 616 each conform generally to the size and shape of a food item such as a biscuit or roll to be cooked on upper pan part 600 over internal chamber 610. Upper pan parts 598 and 600 may be also provided with openings or apertures (not shown) alignable with openings (not shown) formed in peripheral land areas 620 and a central land area 622 of lower pan part 602. The aligned openings serve to facilitate air circulation during a convection type baking process. Separate perforated or unperforated lids 624 and 626 may be positioned over respective upper pan parts 598 and 600 to define respective proofing and/or cooking chambers 628 and 630.

It is to be noted that in a steaming and baking method as described hereinabove, when the dough initially covers less than all (and perhaps none) of the perforations provided in an upper pan part, lower lateral surfaces of the food item are wetted in part by steam escaping from perforations covered by the food item. Steam also escapes from uncovered perforations to increase the humidity of the cooking chamber, whether that chamber is the oven itself or a smaller chamber defined by a cover or lid. In case that a lid is used, the escaping steam may recondense on upper surfaces of the food item, thereby maintaining a substantial degree of moistness on those upper surfaces. The lid may be removed during the steaming phase of the baking process, at the termination of the steaming phase, during the subsequent baking-only phase, or only after the baking pan and the food item have been removed from the oven. Where the food item is a piece of dough, the dough expands during the steaming phase of a baking process to cover an increasing number of perforations in an upper pan part. Some or all of the perforations may be covered by the end of the steaming phase.

The covers or lids described above may be made of a glass or polymeric material, or a metal or alloy. The covers or lids may be perforated or solid, rigid or flexible. For example, aluminum foil may be fashioned to form a cover or lid.

Figure 54:
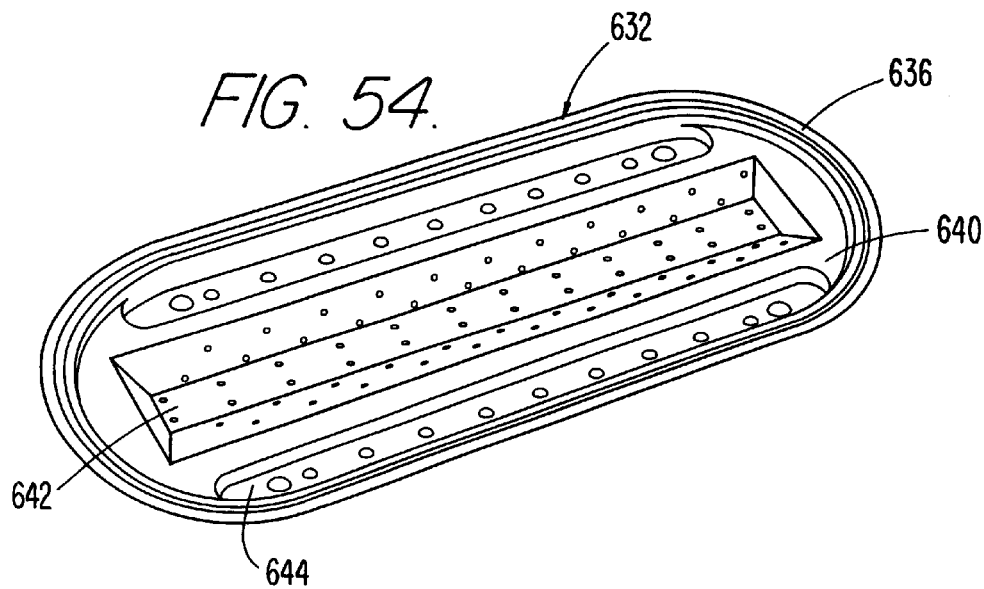
FIGS. 54 and 55 are perspective views of an upper pan part and a lower pan part of another embodiment of a baking pan in accordance with the present invention.
Figure 55:
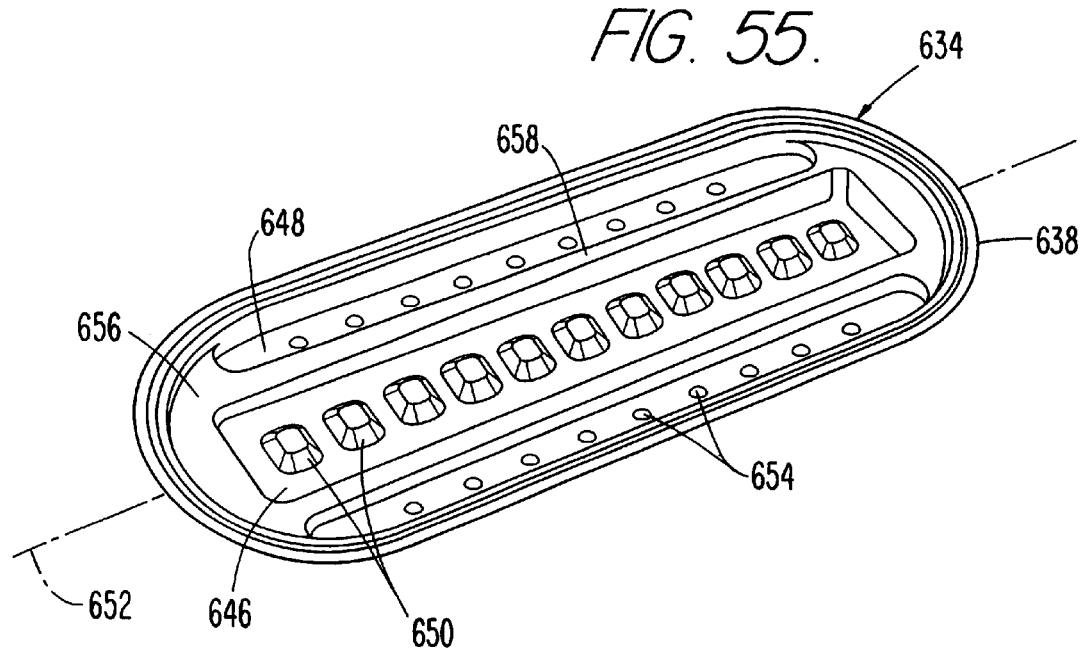

As illustrated in FIGS. 54 and 55, a two-part baking pan includes an upper pan part 632 and a lower pan part 634. Upper pan part 632 is formed with a perimetrally extending rim 636 which forms a close or tight fit with a perimetrally extending rim or periphery 638 of lower pan part 634. Upper pan 632 is additionally formed with a flat land area 640, a central perforated dough-receiving depression 642 and two elongate ancillary depressions 644. Depressions 642 and 644 overlie respective elongate recesses 646 and 648 provided in lower pan part 634. Recess 646 in lower pan part 634 is formed with a plurality of ovoid raised or land areas 650 disposed in a linear array along a longitudinal axis 652 of lower pan part 634. Recesses 648 are similarly provided with bumps or nubs 654 disposed in respective linear arrays parallel to axis 652. As discussed above, raised areas 650 are disposed in effective heat transmitting contact with upper pan part 632 and particularly depression 642 thereof In addition, land areas 656 at opposite ends of lower pan part 634 and ridges 658 extending longitudinally along lower pan part 634 between land areas 656 are in effective heat transmitting contact with land area 640 of upper pan part 632.

With the placement of water in recess 646, raised areas 650 are analogous to islands in a lake. Preferably, raised areas 650 are spaced from the upper pan part 632 by a distance of less than approximately 5 mm. More preferably, raised areas 650 are spaced from upper pan part 632 by a distance of less than approximately 2.5 mm. Most preferably, raised areas 650 are spaced from upper pan part 632 and particularly depression 642 by a distance of less than approximately 1 mm.

Figure 56:
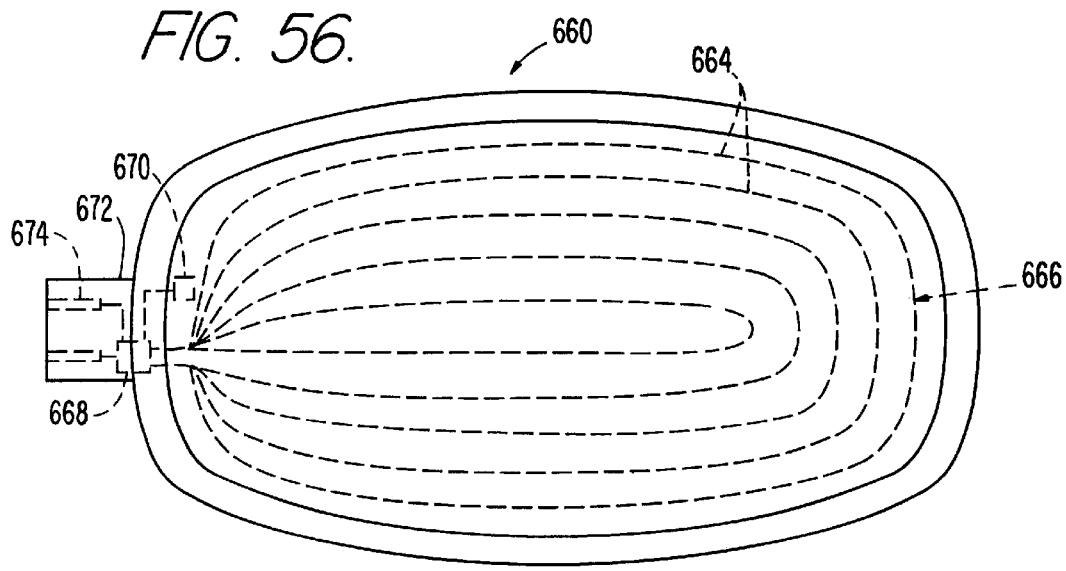
FIG. 56 is a schematic bottom plan view of a cover for a baking pan in accordance with yet a further embodiment of the present invention.
Figure 57:
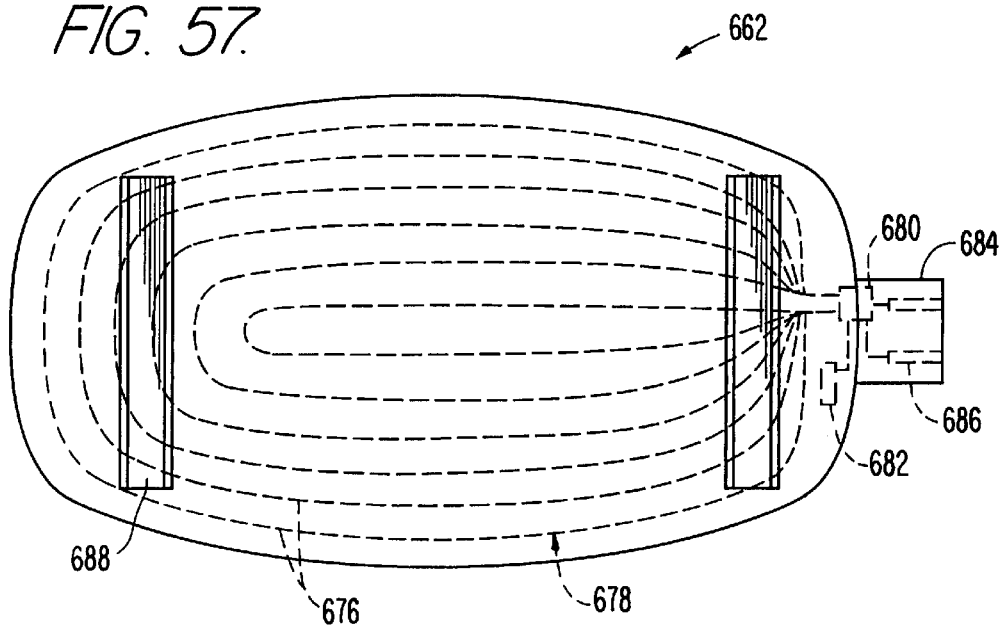
FIG. 57 is a schematic bottom plan view of a lower pan part utilizable in a baking pan using the cover of FIG. 56 or separately in an additional baking pan.

FIGS. 56 and 57 respectively depict a cover 660 and a lower pan part 662 of a baking pan assembly which can be used alternatively as a counter-top dough proofing and baking unit or a baking pan for insertion into a conventional domestic convection oven. Lid or cover 660 is provided with embedded electrical (resistive) heating wires 664 connected in a network 666 to a switch 668. Switch 668 is controlled by a temperature sensor 670 in operative contact with an inner side of cover 660 and is coupled at an input side to an electrical connector 672 such as a plug member made of heat-resistant material and incorporating prongs 674. Lower pan part 662 is likewise provided with embedded electrical (resistive) heating wires 676 connected in a network 678 to a switch 680. Switch 680 is controlled by a temperature sensor 682 in operative contact with an inner side of lower pan part 662 and is coupled at an input side to an electrical connector 684 such as a plug member made of heat-resistant material and incorporating prongs 686. Lower pan part 662 is additionally provided on a lower side with a plurality of stands or legs 688 enabling temporary placement of the baking pan on a counter top. Stands or legs 688 are made of heat resistant material which, like electrical connectors 672 and 684, enable utilization of the baking pan in a baking or steaming and baking process in a conventional oven. It is to be understood that the baking pan including cover 660 and lower pan part 662 also includes an upper pan part and that lower pan part is provided with recesses and other structural formations, as described hereinabove. Cover 660 and lower pan part 662 are provided with outer surface having a layer of heat-resistant thermally insulating material such as ceramic.

Figure 58:
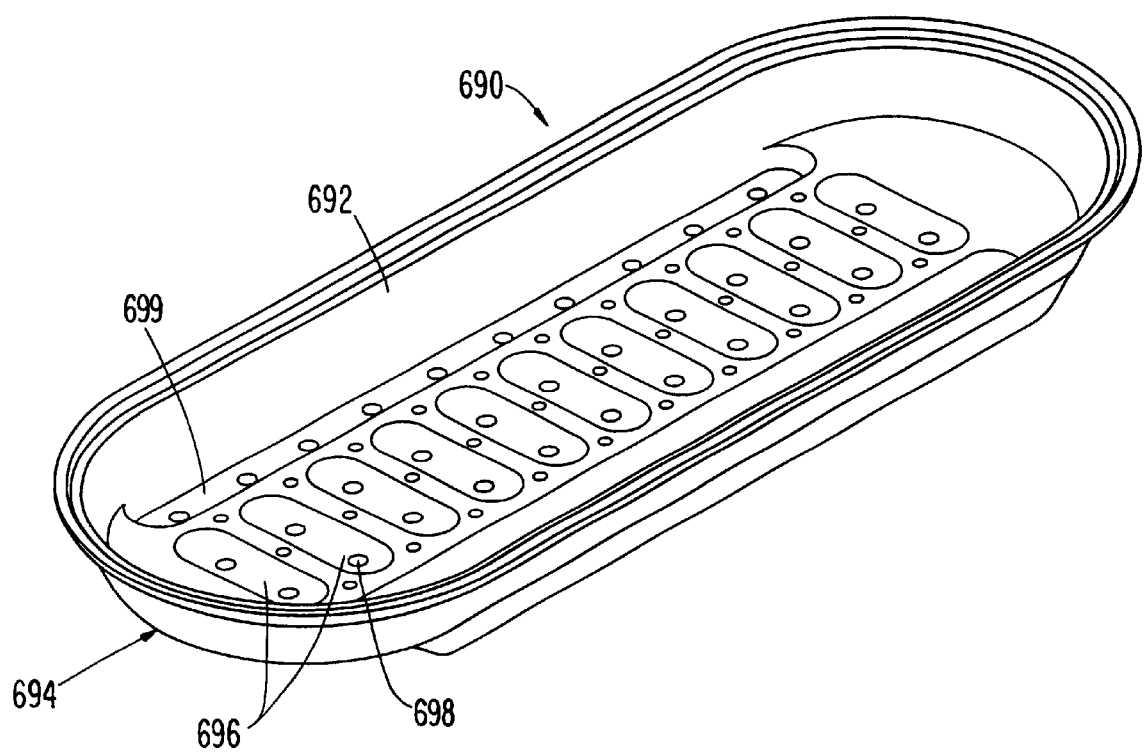
FIG. 58 is a perspective view of an alternative upper pan part utilizable with the lower pan part of FIG. 55.

FIG. 58 depicts an alternative upper pan part 690 utilizable with lower pan part 634 (FIG. 55). Upper pan part 690 has a is provided with a side wall 692 and a central area 694 having a plurality of elongate depressions or recesses 696. Depressions or recesses 696 are provided with perforations 698 and are aligned with respective raised or land areas 650 of lower pan part 55. Longitudinally extending lateral depressions 699 are deeper than depressions 644 of upper pa part 632 (FIG. 54). Pan part 690 is suitable for cooking bagels, calzones, vegetables and other items.

Although the invention has been described in terms of particular embodiments and applications, one of ordinary skill in the art, in light of this teaching, can generate additional embodiments and modifications without departing from the spirit of or exceeding the scope of the claimed invention. For example, previously cooked foodstuffs such as pizza or bread may be reheated by using the method of the present invention. The generation of steam serves to moisten outer and underlying surfaces of a previously cooked food article, thereby reducing, if not eliminating, hardening of the outer surface which frequently occurs on reheating. Moreover, where the previously cooked foodstuff is dried or stale bread, the steam serves to remoisten interior portions of the bread. To that end, the dried or stale bread is placed on a baking pan and covered with a lid. Water placed in the pan remoistens the bread and subsequently the remoistened bread is baked.

The present invention also lends itself readily to the heating of frozen foods. Heating a frozen food item in a conventional oven can occasionally result in a drying out of an external layer of the food item, while the center of the food item remains frozen. In contrast, using a baking pan assembly in accordance with the present invention will keep the external surfaces of the food item moist while the center of the food item is warmed to a desirable temperature.

It is to be understood that heat transfer protrusions such as baffles may be formed on the lower pan portion of a baking pan assembly in accordance with the invention, for purposes of increasing heat transfer from the lower pan portion to steam traveling from the water-receiving recesses or reservoirs to the perforations in the upper pan portion or pan part supporting a food item. Thus, the steam delivered to a food article in a baking method as described herein may be superheated. It is to be additionally understood that virtually any of the individual baking pan parts or panels described herein, for example, with reference to FIGS. 15–21 and FIGS. 30 et seq. may be used by themselves, in combination with an upper pan portion of docking pan, or together with both a upper pan portion and a lower pan portion. Thus, a baking pan kit as described hereinabove with reference to FIGS. 13–23 or 24 et seq. provides a vast number of alternative cooking alternatives.

What is claimed is:

1. A baking pan comprising:
   a lower pan part having a first periphery and at least one raised area spaced from said first periphery; and
   an upper pan part having a second periphery, said upper pan being removably connected to said lower pan part about said second periphery, said raised area being in effective heat-transmitting contact with said upper pan part,
   said raised area being provided with at least one first opening, said upper pan being provided with at least one second opening substantially aligned with said first opening so as to permit air flow from a region below said lower pan part to a region above said upper pan part, thereby facilitating convection heating of a food article disposed on said upper pan part in an oven.

2. The pan defined in claim 1 wherein said lower pan part is provided with a plurality of recesses, said raised area separating said recesses from one another, said upper pan part being provided with a first set of perforations communicating with one of said recesses and a second set of perforations communicating with another of said recesses.

3. The pan defined in claim 2 wherein said first set of perforations are disposed in an array having a first configuration and said second set of perforations are disposed in an array having a second configuration geometrically different from said first configuration.

4. The pan defined in claim 3 wherein said raised area is spaced from said upper pan part by a distance of less than 5 mm.

5. The pan defined in claim 4 wherein said upper pan has a total area and wherein said upper pan part is in effective heat-transmitting contact with said lower pan part throughout at least 20% of said total area.

6. A baking pan comprising:
   a lower pan part having a first periphery and at least one raised area spaced from said first periphery; and
   an upper pan part having a second periphery, said upper pan being removably connected to said lower pan part about said second periphery, said raised area being in effective heat-transmitting contact with said upper pan part,
   said lower pan part being provided with a plurality of recesses, said raised area separating said recesses from one another, said recesses being effectively isolated from one another, said upper pan part being provided with a first set of perforations effectively communicating with only one of said recesses and a second set of perforations effectively communicating with only another of said recesses.

7. The pan defined in claim 6, further comprising a first cover disposable on at least one of said upper pan part and said lower pan part over at least a portion of said upper pan part so as to cover only said first set of perforations, also comprising a second cover disposable on at least one of said upper pan part and said lower pan part over at least a portion of said upper pan part so as to cover only said second set of perforations.

8. The pan defined in claim 7 wherein said first cover has an inner surface which is geometrically substantially congruent to and closely spaced from an outer surface of a food article disposed on said upper pan part over at least some of said first set of perforations during a baking process in a heated enclosure, said second cover has an inner surface which is geometrically substantially congruent to and closely spaced from an outer surface of a food article disposed on said upper pan part over at least some of said second set of perforations during the baking process in a heated enclosure.

9. The pan defined in claim 6 wherein said lower pan part is elongate and provided with a multiplicity of transversely extending elongate ridges defining a multiplicity of elongate recesses, said upper pan part being formed with a depression overlying said recesses, said upper pan part being provided in said depression with a plurality of perforations.

10. The pan defined in claim 9 wherein said raised area is a continuous or endless area extending around said ridges and said recesses, said raised area being provided with a first set of openings, said upper pan being provided with a second set of openings aligned with respective ones of said first set of openings, so as to permit air flow from a region below said lower pan part to a region above said upper pan part, thereby facilitating convection heating of a food article disposed on said upper pan part in an oven.

11. The pan defined in claim 6 wherein said first set of perforations are disposed in an array having a first configuration and said second set of perforations are disposed in an array having a second configuration geometrically different from said first configuration.

12. The pan defined in claim 6 wherein said upper pan part is formed of two separable portions, said first set of perforations being located in one of said portions, said second set of perforations being located in another of said portions.

13. The pan defined in claim 6 wherein said raised area is provided with at least one first opening, said upper pan being provided with at least one second opening substantially aligned with said first opening so as to permit air flow from a region below said lower pan part to a region above said upper pan part, thereby facilitating convection heating of a food article disposed on said upper pan part in an oven.

14. The pan defined in claim 6, further comprising a cover disposable on at least one of said upper pan part and said lower pan part over at least a portion of said upper pan part so as to cover said first set of perforations and said second set of perforations.

15. The pan defined in claim 6 wherein at least one of the recesses in said lower pan part is provided with a plurality of raised areas spaced from one another.

16. The pan defined in claim 6 wherein said upper pan part has a total area and wherein said upper pan part is in effective heat-transmitting contact with said lower pan part throughout at least 20% of said total area.

17. The pan defined in claim 16 wherein said upper pan has a total area and wherein said upper pan part is in effective heat-transmitting contact with said lower pan part throughout at least 40% of said total area.

18. The pan defined in claim 17 wherein said upper pan has a total area and wherein said upper pan part is in effective heat-transmitting contact with said lower pan part throughout at least 70% of said total area.

19. The pan defined in claim 6 wherein said raised area is spaced from said upper pan part by a distance of less than 5 mm.

20. The pan defined in claim 19 wherein said raised area is spaced from said upper pan part by a distance of less than 2.5 mm.

21. The pan defined in claim 20 wherein said raised area is spaced from said upper pan part by a distance of less than 1 mm.

22. A baking pan comprising:
   a lower pan part having a first periphery and at least one raised area spaced from said first periphery; and
   an upper pan part having a second periphery, said upper pan being removably connected to said lower pan part about said second periphery, said raised area being in effective heat-transmitting contact with said upper pan part, said upper pan part having a central region provided with a plurality of perforations and a pair of peripheral regions on opposite sides of said central region, said central region being separated from said peripheral regions by raised areas to define recesses in said peripheral regions, whereby a food item may be placed on said central region and water may be deposited in said peripheral regions.

23. The pan defined in claim 22 wherein said central region has a concave surface to form a depression for receiving said food item, said perforations being provided in said depression.

24. A baking pan comprising:

a lower pan part having a first periphery and at least one raised area spaced from said first periphery;

an upper pan part having a second periphery, said upper pan being removably connected to said lower pan part about said second periphery, said raised area being in effective heat-transmitting contact with said upper pan part; and a cover disposable on at least one of said upper pan part and said lower pan part over at least a portion of said upper pan part, said cover having an inner surface which is geometrically substantially congruent to and closely spaced from an outer surface of a food article disposed on said upper pan part during a baking process in a heated enclosure, thereby providing for an even browning of said outer surface during said baking process.

25. The pan defined in claim 24 wherein said cover is deeper than each of said upper pan part and said lower pan part.

26. A baking pan comprising:

a lower pan part having a first periphery and at least one raised area spaced from said first periphery; and an upper pan part having a second periphery, said upper pan being removably connected to said lower pan part about said second periphery, said raised area being in effective heat-transmitting contact with said upper pan part, said lower pan part being formed with at least one recess, said raised area being one of a plurality of raised areas spaced from one another in said recess.

27. The pan defined in claim 26 wherein said raised areas are disposed in a linear area.

28. The pan defined in claim 26 wherein said raised areas are disposed in a linear array along a longitudinal axis of said recess.

29. A baking pan comprising:

a lower pan part having a first periphery and at least one raised area spaced from said first periphery;

an upper pan part having a second periphery, said upper pan being removably connected to said lower pan part about said second periphery, said raised area being in effective heat-transmitting contact with said upper pan part; and a cover disposable on at least one of said upper pan part and said lower pan part over at least a portion of said upper pan part, said cover being provided with embedded electrical resistance heating wires and at least one detachable heat-resistant electrical connector.

30. The pan defined in claim 29 wherein said lower pan part is provided with embedded electrical resistance heating wires and at least one detachable heat-resistant electrical connector.

31. The pan defined in claim 30, further comprising at least one temperature sensor mounted to at least one of said cover and said lower pan part.

32. The pan defined in claim 30 wherein said lower pan part is provided with a thermally insulating stand.

33. The pan defined in claim 30 wherein said said lower pan part and said cover are provided with respective outer layers of heat-resistant thermal insulating material.

* * * * *